(12) United States Patent
Kuwabara

(10) Patent No.: US 10,691,276 B2
(45) Date of Patent: Jun. 23, 2020

(54) LAMINATE FOR SEE-THROUGH ELECTRODES, SEE-THROUGH ELECTRODE MATERIAL, DEVICE AND METHOD FOR PRODUCING LAMINATE FOR SEE-THROUGH ELECTRODES

(71) Applicant: Panasonic Intellectual Property Management Co., Ltd., Osaka (JP)

(72) Inventor: Shin Kuwabara, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/318,695

(22) PCT Filed: Jun. 28, 2017

(86) PCT No.: PCT/JP2017/023720
§ 371 (c)(1),
(2) Date: Jan. 17, 2019

(87) PCT Pub. No.: WO2018/020940
PCT Pub. Date: Feb. 1, 2018

(65) Prior Publication Data
US 2019/0187841 A1 Jun. 20, 2019

(30) Foreign Application Priority Data
Jul. 26, 2016 (JP) .................. 2016-146696

(51) Int. Cl.
*G06F 3/044* (2006.01)
*B32B 15/08* (2006.01)
(Continued)

(52) U.S. Cl.
CPC ............... *G06F 3/044* (2013.01); *B32B 7/12* (2013.01); *B32B 15/08* (2013.01); *B32B 15/20* (2013.01);
(Continued)

(58) Field of Classification Search
CPC ......... B32B 15/08; B32B 15/09; B32B 15/20; B32B 7/12; B32B 2307/412;
(Continued)

(56) References Cited

U.S. PATENT DOCUMENTS 9,980,394 B2 * 5/2018 Stay ...................... G06F 3/041
2005/0048306 A1 3/2005 Suzuki et al.
(Continued)

FOREIGN PATENT DOCUMENTS

CN 101662892 A 3/2010
JP 2007-186797 7/2007
(Continued)

OTHER PUBLICATIONS

English translation of JP 2015034955 used by the examiner (Year: 2015).*
(Continued)

*Primary Examiner* — Nelson M Rosario
(74) *Attorney, Agent, or Firm* — McDermott Will & Emery LLP

(57) ABSTRACT

A laminate for a see-through electrode includes a transparent base and a metal layer that is provided on at least one of both surfaces of the transparent base. The metal layer has a first surface and a second surface, the first surface facing the transparent base, the second surface being at a side opposite to the first surface. And the second surface has a kurtosis (Rku) ranging from 1.00 to 3.10, inclusive.

19 Claims, 19 Drawing Sheets

(51) Int. Cl.
  *C25D 7/06*      (2006.01)
  *B32B 15/20*     (2006.01)
  *C25F 3/24*      (2006.01)
  *C23F 3/04*      (2006.01)
  *C25D 1/04*      (2006.01)
  *B32B 7/12*      (2006.01)
  *C25F 3/16*      (2006.01)

(52) U.S. Cl.
  CPC .................. *C23F 3/04* (2013.01); *C25D 1/04* (2013.01); *C25D 7/06* (2013.01); *C25F 3/16* (2013.01); *C25F 3/24* (2013.01); *G06F 3/0445* (2019.05); *B32B 2307/412* (2013.01); *B32B 2457/208* (2013.01); *G06F 2203/04103* (2013.01); *G06F 2203/04112* (2013.01)

(58) Field of Classification Search
  CPC ... B32B 2457/208; C23C 14/14; C23C 22/02; C23C 2222/20; C23F 3/04; C23F 3/06; C25D 1/04; C25D 7/06; C25D 7/0614; C25F 3/16; C25F 3/22; G06F 2203/04103; G06F 2203/04112; G06F 3/044; G06F 3/0445; H01B 5/14
  See application file for complete search history.

(56) References Cited

U.S. PATENT DOCUMENTS

| | | | |
|---|---|---|---|
| 2013/0285041 | A1 | 10/2013 | Suematsu et al. |
| 2016/0044778 | A1 | 2/2016 | Irie et al. |

FOREIGN PATENT DOCUMENTS

| | | |
|---|---|---|
| JP | 2008-129708 | 6/2008 |
| JP | 2011-009267 A | 1/2011 |
| JP | 2012-194644 | 10/2012 |
| JP | 2013-124377 | 6/2013 |
| JP | 2014-216175 | 11/2014 |
| JP | 2015-034955 | 2/2015 |
| TW | 201501920 A | 1/2015 |
| WO | 2012/081471 | 6/2012 |
| WO | 2014/156489 | 10/2014 |
| WO | 2016/017773 | 2/2016 |

OTHER PUBLICATIONS

International Search Report of PCT application No. PCT/JP2017/023720 dated Aug. 22, 2017.
English Translation of Chinese Search Report dated Nov. 20, 2019 for the related Chinese Patent Application No. 201780045453.8.

* cited by examiner

LAMINATE FOR SEE-THROUGH ELECTRODES, SEE-THROUGH ELECTRODE MATERIAL, DEVICE AND METHOD FOR PRODUCING LAMINATE FOR SEE-THROUGH ELECTRODES

CROSS-REFERENCE TO RELATED APPLICATIONS

This application is a U.S. national stage application of the PCT International Application No. PCT/JP2017/023720 filed on Jun. 28, 2017, which claims the benefit of foreign priority of Japanese patent application No. 2016-146696 filed on Jul. 26, 2016, the contents all of which are incorporated herein by reference.

TECHNICAL FIELD

The present disclosure relates to a laminate for see-through electrode, a see-through electrode material, a device including the see-through electrode material, and a laminate for see-through electrode.

BACKGROUND

A touch panel sensor including a see-through electrode having a mesh structure constructed with a miniaturized (hereinafter, referred to as finely-patterned) circuit pattern layer is being developed in response to an increasing need for enlargement and high sensitivity of the recent touch panel sensor.

When a thick metal layer is used as a material for preparing the finely-patterned circuit pattern layer, an etching time is lengthened until etching reaches a base surface, perpendicularity of a sidewall of the circuit pattern layer is broken, and there is a risk of generating disconnection in the case that the circuit pattern layer to be formed has a narrow line width. For this reason, there is a demand that a thickness of the metal layer for the fine pattern is less than or equal to 9 μm.

An extremely thin copper foil with support in which an extremely thin copper foil is electrodeposited on a carrier (support) constructed with a thick electrolytic copper foil with a peeling layer interposed therebetween is used as a material of the metal layer for the fine pattern.

Unexamined Japanese Patent Publication No. 2008-129708, Unexamined Japanese Patent Publication No. 2012-194644, and Unexamined Japanese Patent Publication No. 2013-124377 disclose a metal vapor deposition film in which the metal layer is directly formed on a surface of a transparent base by physical vapor deposition as a material including the thick metal layer suitable for the fine pattern.

SUMMARY

According to a first aspect of the present disclosure, a laminate for a see-through electrode includes a transparent base and a metal layer that is provided on at least one of both surfaces of the transparent base. The metal layer has a first surface and a second surface. The first surface faces the transparent base. The second surface is at a side opposite to the first surface. The second surface has a kurtosis (Rku) ranging from 1.00 to 3.10, inclusive.

As used herein, the term "the metal layer that is provided on at least one of both surfaces of the transparent base" includes the case that another layer such as a transparent adhesive layer is interposed between the transparent base and the metal layer.

According to a second aspect of the present disclosure, a material for a see-through electrode includes the laminate in which the metal layer partly includes a circuit pattern having an opening.

According to a third aspect of the present disclosure, a device includes the material and a control circuit that is electrically connected to the circuit pattern layer.

According to a fourth aspect of the present disclosure, a method of producing a laminate for a see-through electrode includes a first step and a second step. The first step is preparing a transparent base. The transparent base has a first main surface and a second main surface. The first main surface has a kurtosis (Rku) ranging from 1.00 to 3.10, inclusive. And a second step is forming a metal layer on the first main surface by physical vapor deposition.

According to a fifth aspect of the present disclosure, a method of producing a laminate for see-through electrode includes a first step, a second step, and a third step. The first step is producing a metal layer with a support by preparing the support having a first main surface and a second main surface, forming a peeling layer on the first main surface, and then forming the metal layer on the peeling layer by electroplating. The first main surface has a kurtosis (Rku) ranging from 1.00 to 3.10, inclusive. The second step is producing a transparent base with a transparent adhesive layer by preparing the transparent base, and forming a transparent adhesive layer on at least one of both surfaces of the transparent base. And the third step is bonding a surface of the metal layer with the support on which the metal layer is provided and a surface of the transparent base with the transparent adhesive layer on which the transparent adhesive layer is provided, and then peeling off the support and the peeling layer from the metal layer.

According to a sixth aspect of the present disclosure, a method of producing a laminate for see-through electrode includes a first step, a second step, and a third step. The first step is producing a metal layer with a support by preparing the support having a first main surface and a second main surface, forming a peeling layer on the first main surface, and then forming a metal layer on the peeling layer by physical vapor deposition. The first main surface has a kurtosis (Rku) ranging from 1.00 to 3.10, inclusive. The second step is producing a transparent base with a transparent adhesive layer by preparing a transparent base, and forming a transparent adhesive layer on at least one of both surfaces of the transparent base. And the third step is bonding a surface of the metal layer with the support on which the metal layer is provided and a surface of the transparent base with the transparent adhesive layer on which the transparent adhesive layer is provided, and then peeling off the support and the peeling layer from the metal foil.

According to the present disclosure, disconnection is hardly generated even if bending is performed after the circuit is formed.

DESCRIPTION OF EMBODIMENTS

Figure 14A:
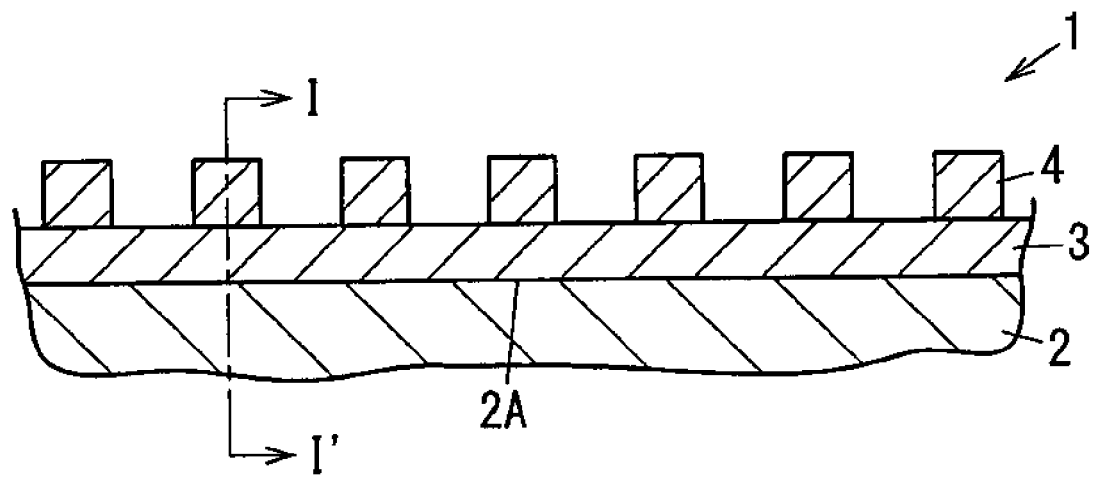
FIG. 14A is a schematic sectional view of a material for see-through electrode for touch panel sensor prepared using a conventional extremely thin copper foil with support.
Figure 14B:
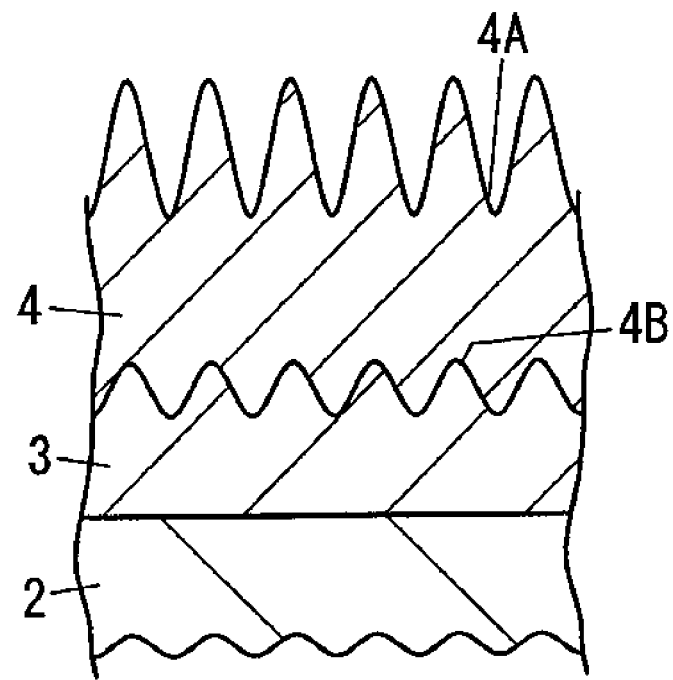
FIG. 14B is a schematic sectional view of the material for see-through electrode taken along line I-I' in FIG. 14A.
Figure 15A:
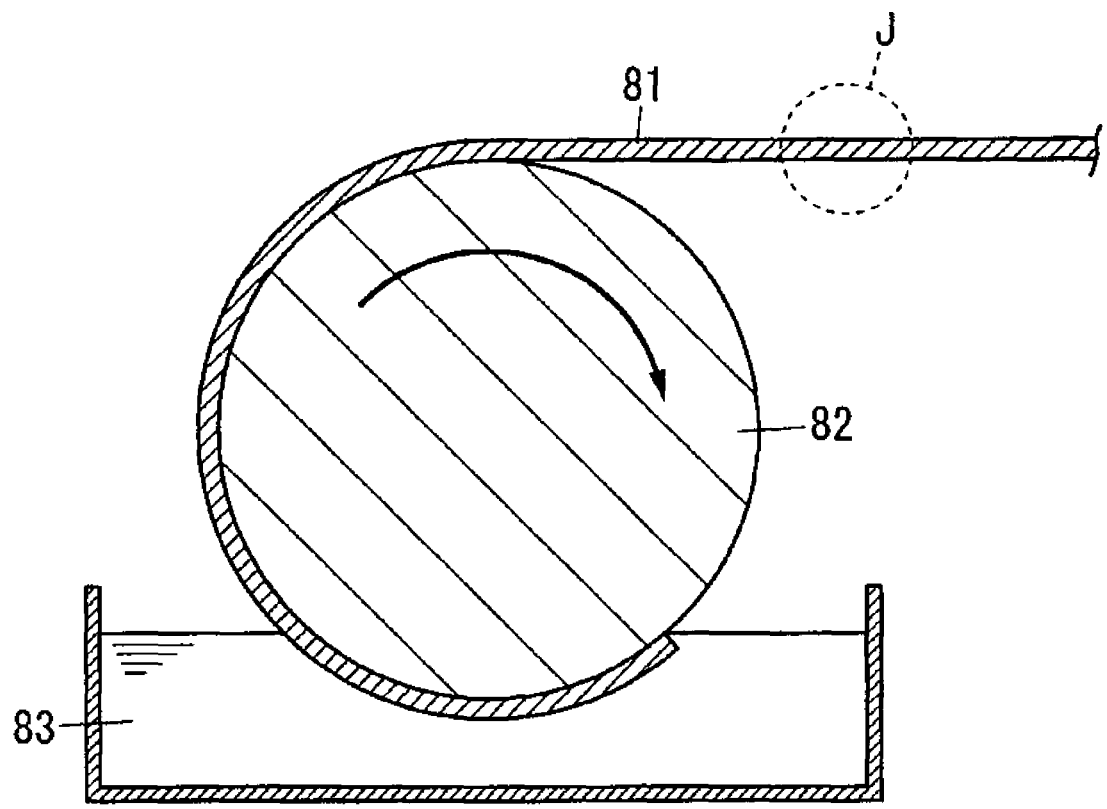
FIG. 15A is a schematic sectional view illustrating the electrolytic metal foil producing method by the electrolytic step in which the electrodeposition drum is used.
Figure 15B:
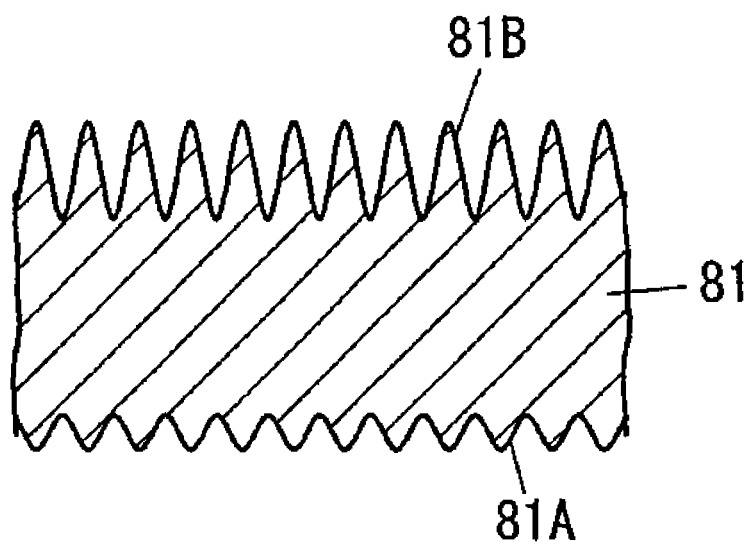
FIG. 15B is an enlarged sectional view of an electrolytic metal foil in a J portion in FIG. 15A.
Figure 16A:
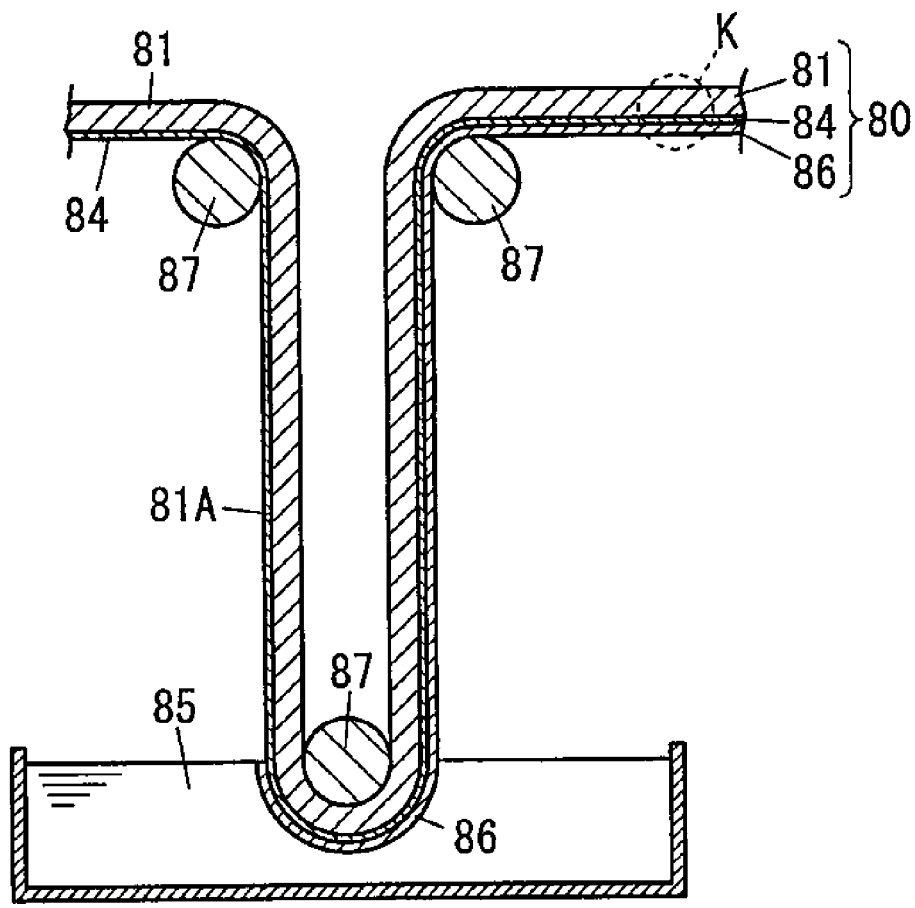
FIG. 16A is a schematic sectional view illustrating a method of producing an extremely thin copper foil with support.
Figure 16B:
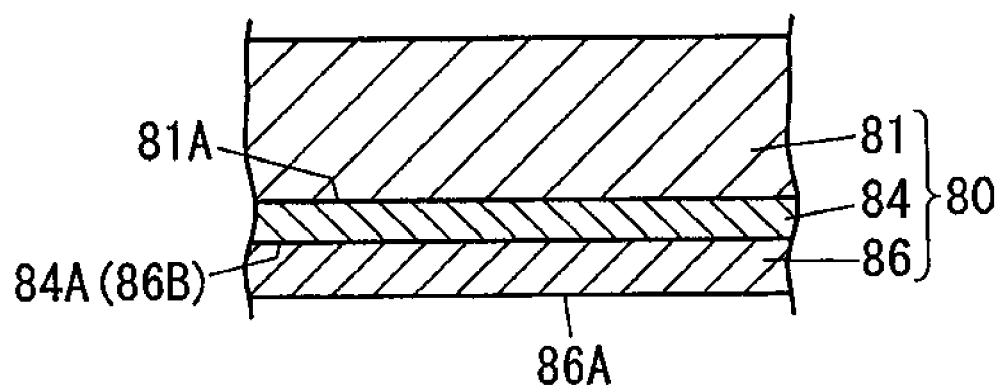
FIG. 16B is an enlarged sectional view of the extremely thin copper foil with support in a K portion in FIG. 16A.
Figure 17A:
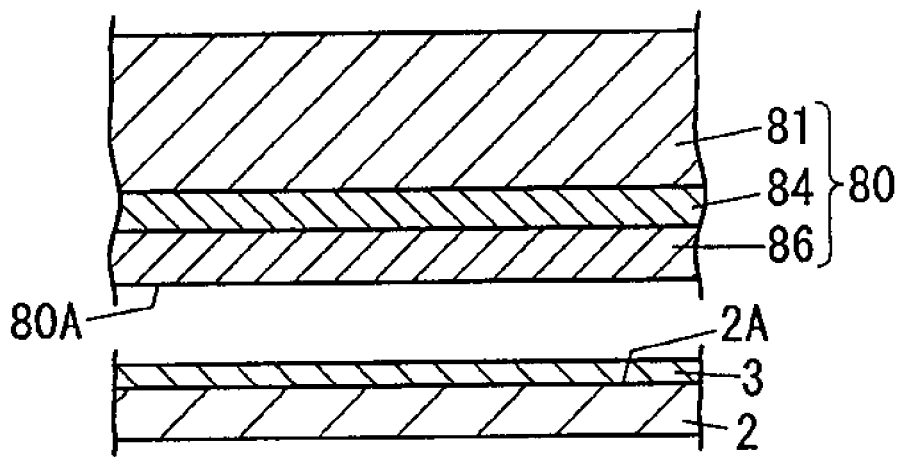
FIG. 17A is a schematic explanatory view illustrating a method for producing a laminate for see-through electrode.
Figure 17B:
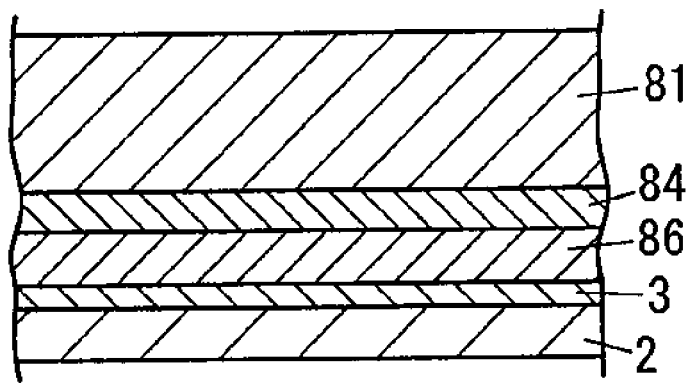
FIG. 17B is a schematic explanatory view illustrating the method for producing the laminate for see-through electrode.
Figure 17C:
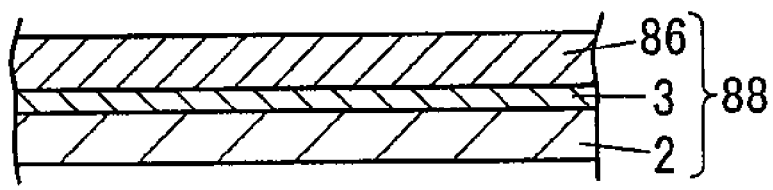
FIG. 17C is a schematic explanatory view illustrating the method for producing the laminate for see-through electrode.

Prior to description of an exemplary embodiment of the present disclosure, problems found in conventional techniques will briefly be described. FIG. 14A is a schematic sectional view of see-through electrode material 1 for touch panel sensor prepared using a conventional extremely thin copper foil with support. FIG. 14B is a schematic sectional view of the see-through electrode material 1 taken along line I-I' in FIG. 14A. In FIGS. 14A and 14B, the reference mark 1 denotes the see-through electrode material for touch panel sensor, the reference mark 2 denotes a transparent substrate, the reference mark 3 denotes a transparent adhesive layer, and the reference mark 4 denotes a circuit pattern layer. FIG. 15A is a schematic sectional view illustrating a method for producing electrolytic metal foil 81 by an electrolytic step in which electrodeposition drum 82 is used. FIG. 15B is an enlarged sectional view of electrolytic metal foil 81 in a J portion in FIG. 15A. In FIGS. 15A and 15B, the reference mark 81 denotes the electrolytic metal foil, the reference mark 82 denotes the electrodeposition drum, the reference mark 83 denotes an electrolyte tank, the reference mark 81A denotes a first main surface on a side contacting with electrodeposition drum 82, and the reference mark 81B denotes a second main surface on a side that does not contact with electrodeposition drum 82. FIG. 16A is a schematic explanatory view illustrating a method for producing extremely thin copper foil with support 80. FIG. 16B is an enlarged sectional view of extremely thin copper foil with support 80 in a K portion in FIG. 16A. In FIGS. 16A and 16B, the reference mark 84 denotes a peeling layer, the reference mark 85 denotes an electrolyte tank, the reference mark 86 denotes a extremely thin copper foil (hereinafter, also referred to as an electrolytic metal layer), and the reference mark 87 denotes a conveyance roller. FIGS. 17A to 17C are schematic explanatory views illustrating a method for producing laminate for see-through electrode 88. In FIGS. 17A to 17C, the reference mark 88 denotes a laminate for see-through electrode.

In the case that conventional see-through electrode material 1 is prepared, typically extremely thin copper foil with support 80 is used. FIGS. 15A to 17C illustrate an example of a procedure to prepare extremely thin copper foil with support 80.

First, electrolytic metal foil 81 that becomes a support is prepared. Specifically, as illustrated in FIG. 15A, electrodeposition drum 82 is immersed in electrolyte tank 83 with electrodeposition drum 82 as a negative electrode and with a frame (not illustrated) having an arc shape in section opposed to electrodeposition drum 82 as a positive electrode. Subsequently, current is passed between the positive electrode and the negative electrode while electrodeposition drum 82 is rotated, which allows electrolytic metal foil 81 to be electrodeposited on a surface of electrodeposition drum 82 with a predetermined thickness. Subsequently, electrolytic metal foil 81 is peeled off from electrodeposition drum 82 to continuously prepare electrolytic metal foil 81. At this point, a polishing trace of the surface of electrodeposition drum 82 remains on first main surface 81A of electrolytic metal foil 81. The polishing trace is mainly provided in order to peel off electrolytic metal foil 81 from the surface of electrodeposition drum 82.

Subsequently, peeling layer 84 is formed on first main surface 81A, and immersed in electrolyte tank 85 with electrolytic metal foil 81 as the negative electrode as illustrated in FIG. 16A. Subsequently, extremely thin copper foil 86 is electrodeposited on the surface (the surface of peeling layer 84) on a side of first main surface 81A of electrolytic metal foil 81 by passing current between the positive electrode and the negative electrode, thereby forming extremely thin copper foil 86 having a predetermined thickness. Consequently, extremely thin copper foil with support 80 is obtained.

At this point, a degree of sharpness of surface 84A on an opposite side to a side facing electrolytic metal foil 81 of peeling layer 84 formed on first main surface 81A is substantially identical to a degree of sharpness of first main surface 81A because peeling layer 84 is a very thin layer. Similarly, a degree of sharpness of surface 86A (hereinafter, referred to as a first surface 86A) on an opposite side to a side facing electrolytic metal foil 81 of extremely thin copper foil 86 formed on peeling layer 84 can be estimated to be substantially identical to a degree of sharpness of surface 86B on a side facing electrolytic metal foil 81 of extremely thin copper foil 86 because extremely thin copper foil 86 is very thin foil. For this reason, the degree of sharpness of first surface 86A becomes substantially identical to the degree of sharpness of first main surface 81A, and the polishing trace of electrodeposition drum 82 also remains.

Subsequently, surface 80A of extremely thin copper foil 86 of prepared extremely thin copper foil with support 80 and main surface 2A of transparent substrate 2 are opposed to each other as illustrated in FIG. 17A, bonded to each other with transparent adhesive layer 3 interposed therebetween as illustrated in FIG. 17B, and subjected to pressure bonding-annealing curing. Subsequently, electrolytic metal foil 81 that is a support is peeled and removed. Consequently, laminate for see-through electrode 88 in FIG. 17C is obtained.

Subsequently, a part of extremely thin copper foil 86 is removed by etching or the like, circuit pattern layer 4 is formed, and see-through electrode material 1 is prepared.

However, when obtained see-through electrode material 1 is bent, as illustrated in FIG. 14B, a stress tends to be locally applied to recess 4A caused by the polishing trace of electrodeposition drum 82 on the opposite side to the side of transparent substrate 2 of circuit pattern layer 4. Consequently, a crack tends to be generated in circuit pattern layer 4 with recess 4A as a start point. As a result, there is a risk that circuit pattern layer 4 is split to generate disconnection. The similar problem arises in a see-through electrode material for touch panel sensor in which a metal vapor deposition film is used, which is described in PTLs 1 to 3.

The present disclosure provides a laminate for see-through electrode in which the disconnection is hardly generated even if the laminate for see-through electrode is bent after the circuit is formed, a see-through electrode material, a device, and a laminate for see-through electrode producing method.

Hereinafter, an exemplary embodiment of the present disclosure will be described.

The laminate for see-through electrode assumes that the electrode is formed on both surfaces. However, the laminate for see-through electrode may be used while the electrode is formed only on one side.

[Laminate for See-Through Electrode 100 of First Exemplary Embodiment]

Figure 1A:
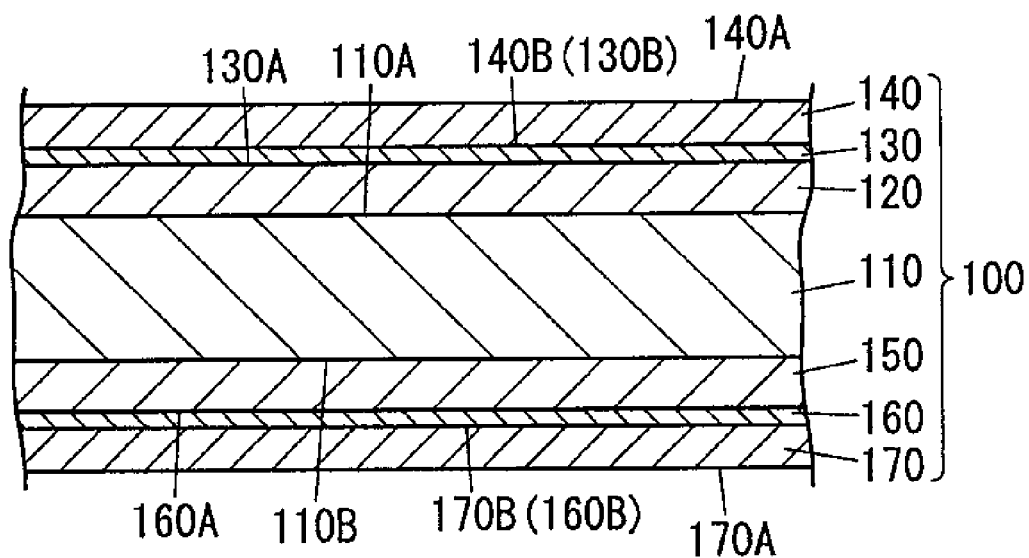
FIG. 1A is a sectional view in a thickness direction of a laminate for see-through electrode according to a first exemplary embodiment.
Figure 2:
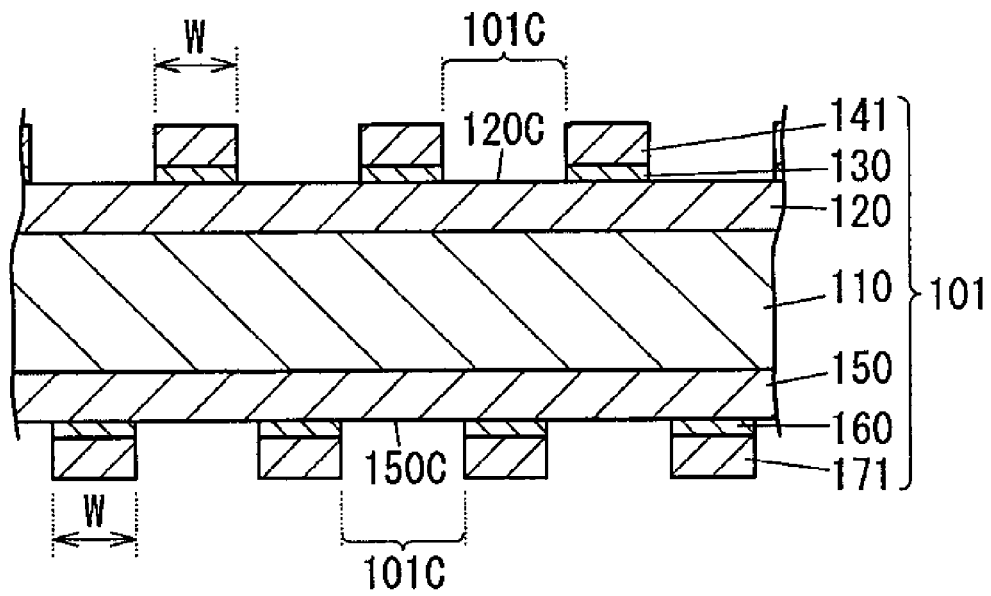
FIG. 2 is a sectional view in a thickness direction of a material for see-through electrode of the first exemplary embodiment.

FIG. 1A is a sectional view in a thickness direction of laminate for see-through electrode 100 (hereinafter, referred to as a first laminate for see-through electrode 100) according to a first exemplary embodiment. FIG. 2 is a sectional view in a thickness direction of see-through electrode material 101 (hereinafter, referred to as a first see-through electrode material 101) of the first exemplary embodiment. In FIG. 2, the same component as that of first laminate for see-through electrode 100 in FIG. 1A is denoted by the same reference mark. In FIG. 1A, the reference mark 100 denotes the first laminate for see-through electrode, the reference mark 110 denotes a first transparent base, the reference mark 120 denotes a first transparent adhesive layer, the reference mark 130 denotes a first reflection reducing layer, the reference mark 140 denotes a first metal layer, the reference mark 150 denotes a second transparent adhesive layer, the reference mark 160 denotes a second reflection reducing layer, and the reference mark 170 denotes a second metal layer. In FIG. 2, the reference mark 101 denotes the first see-through electrode material, the reference mark 101C denotes an opening, the reference mark 120C denotes a first outer surface corresponding to opening 101C of first transparent adhesive layer 120, the reference mark 150C denotes a second outer surface corresponding to opening 101C of second transparent adhesive layer 150, the reference mark 141 denotes a first circuit pattern layer, and the reference mark 171 denotes a second circuit pattern layer.

As illustrated in FIG. 1A, first laminate for see-through electrode 100 includes first transparent base 110, first transparent adhesive layer 120, first reflection reducing layer 130, first metal layer 140, second transparent adhesive layer 150, second reflection reducing layer 160, and second metal layer 170. First transparent base 110 includes first main surface 110A and second main surface 110B. First transparent adhesive layer 120, first reflection reducing layer 130, and first metal layer 140 are laminated on first main surface 110A of first transparent base 110 in this order. Second transparent adhesive layer 150, second reflection reducing layer 160, and second metal layer 170 are laminated on second main surface 110B of first transparent base 110 in this order. Hereinafter, sometimes first main surface 110A and second main surface 110B are simply referred to as main surfaces 110A, 110B. Sometimes first transparent adhesive layer 120 and second transparent adhesive layer 150 are simply referred to as transparent adhesive layers 120, 150. Sometimes first outer surface 120C and second outer surface 150C are simply referred to as outer surfaces 120C, 150C. Sometimes first reflection reducing layer 130 and second reflection reducing layer 160 are simply referred to as reflection reducing layers 130, 160. Sometimes first metal layer 140 and second metal layer 170 are referred to as metal layers 140, 170. Sometimes first circuit pattern layer 141 and second circuit pattern layer 171 are referred to as circuit pattern layers 141, 171.

In the first exemplary embodiment, kurtosis (Rku) of surface 140A of first metal layer 140 (hereinafter, sometimes referred to as first main surface 140A) on an opposite side to a side facing first transparent base 110 ranges from 1.00 to 3.10, preferably ranges from 2.00 to 3.05, more preferably ranges from 2.00 to 3.00. Kurtosis (Rku) of surface 170A of second metal layer 170 (hereinafter, sometimes referred to as first main surface 170A) on the opposite side to the side facing first transparent base 110 ranges from 1.00 to 3.10, preferably ranges from 2.00 to 3.05, more preferably ranges from 2.00 to 3.00. When kurtosis (Rku) of first main surface 140A and kurtosis (Rku) of first main surface 170A fall within the above range, a few protrusions (mountain) or recesses (valley) exist in first main surface 140A and first main surface 170A, and a roughness curve (JIS B 0601: 2001) is relatively rounded. For this reason, a stress is hardly locally applied to a specific region even if first see-through electrode material 101 is repeatedly bent after metal layers 140, 170 are molded to form circuit pattern layers 141, 171 in FIG. 2. As a result, circuit pattern layers 141, 171 are hardly disconnected even if first see-through electrode material 101 is bent. At this point, kurtosis (Rku) is a value measured by the same measurement method as the measurement of kurtosis (Rku) described in Example.

Kurtosis (Rku) is a parameter defined by JIS B 0601: 2001, expresses a four power mean value of Z(x) in a non-dimensional reference length obtained by the fourth power of root-mean-square height (Zq), and is given by the following equation. Kurtosis (Rku) is 3 for a Gaussian distribution.

$$Rku = \frac{1}{Zq^4}\left[\frac{1}{N}\sum_{n-1}^{N} Zn^4\right]$$

That is, kurtosis (Rku) characterizes extent of Z(x) (height distribution) on a scale of surface sharpness. When kurtosis (Rku) is greater than 3.0, the height distribution is sharp. When kurtosis (Rku) is less than 3, the height distribution is smooth. In the first exemplary embodiment, the reason why an upper limit of a numerical range of kurtosis (Rku) of first main surface 140A and kurtosis (Rku) of first main surface 170A is set to 3.10 is that the disconnection is not generated until kurtosis (Rku) is 3.10 as a result of experiments.

In the first exemplary embodiment, the reason why surface qualities of first main surface 140A of first metal layer 140 and first main surface 170A of second metal layer 170 are defined by kurtosis (Rku) is whether the disconnection of circuit pattern layers 141, 171 is generated can more correctly be recognized when first see-through electrode material 101 is bent as compared with the case that the surface quality is defined by surface roughness (Rz) conventionally used as an evaluation index. In surface roughness (Rz), as is clear from results of Example and Comparative Example (to be described later), when first see-through electrode material 101 is bent even in the same measurement value, the disconnection of circuit pattern layers 141, 171 is occasionally generated or not occasionally generated, and the generation of the disconnection cannot unerringly be recognized. As used herein, surface roughness (Rz) means a ten-point average roughness defined by JIS B 0601 (1994).

(First Transparent Base 110)

First transparent base 110 is a sheet-shaped object including main surfaces 110A, 110B. A material constituting first transparent base 110 may appropriately be selected according to use of first laminate for see-through electrode 100, and transparent resins such as polyethylene-terephthalate (PET), polyethylenenaphthalate (PEN), polycarbonate (PC), and polymethyl methacrylate (PMMA) can be used as the material constituting first transparent base 110. First transparent base 110 may contain an addition type or reaction type flame retardant such as tetrabromobisphenol-A. The thickness of first transparent base 110 may appropriately be selected according to use of first laminate for see-through electrode 100, and preferably the thickness ranges from 24 μm to 300 μm, more preferably ranges from 35 μm to 260 μm. When the thickness of first transparent base 110 falls within the above range, a wrinkle is hardly generated, it is easy to handle, and transparency is excellent.

[Transparent Adhesive Layers 120, 150]

Transparent adhesive layers 120, 150 are formed on main surfaces 110A, 110B of first transparent base 110. First transparent adhesive layer 120 and second transparent adhesive layer 150 may have the same configuration or different configurations.

Transparent adhesive layers 120, 150 are formed by curing a transparent adhesive. For example, preferably a material constituting the transparent adhesive contains an acrylic resin, an epoxy resin, a urethane resin, or a mixed resin thereof. In particular, the acrylic resin, the urethane resin, or the mixed resin thereof has excellent transparency and is optically useful.

Preferably hardness of transparent adhesive layers 120, 150 ranges from 1.0 N/mm² to 200 N/mm², more preferably ranges from 4.0 N/mm² to 175 N/mm². When the hardness of transparent adhesive layers 120, 150 falls within the above range, adhesive elongation that causes the disconnection can be prevented. The hardness of transparent adhesive layers 120, 150 is a value measured with a nanoindentation device.

Preferably the thicknesses of transparent adhesive layers 120, 150 range from 0.5 μm to 10.00 μm, more preferably range from 1.0 μm to 8.00 μm.

Preferably elastic moduli at 25° C. of transparent adhesive layers 120, 150 range from 0.01 GPa to 1000.0 GPa, more preferably ranges from 0.1 GPa to 100.0 GPa, further preferably ranges from 0.6 GPa to 60.0 GPa, particularly preferably ranges from 0.6 GPa to 10.0 GPa. When the elastic moduli at 25° C. of transparent adhesive layers 120, 150 fall within the above range, transparent adhesive layers 120, 150 function easily as a stress relaxation layer for circuit pattern layers 141, 171 when first see-through electrode material 101 is bent.

A commercially available measurement device used to measure a bend elastic constant (JIS K7171) or tensile elasticity (JIS K7162) can be used in the measurement of the elastic modulus. In the case that the elastic moduli of transparent adhesive layers 120, 150 are hardly directly measured because the thicknesses of transparent adhesive layers 120, 150 are less than or equal to 10 μm, a Vickers hardness meter or a micro Vickers hardness meter can be used. A quadrangular pyramid penetrator (or a measurement head) of the micro Vickers hardness meter is pressed against transparent adhesive layers 120, 150 to be measured with predetermined pressure (for example, a test force generation range ranges from 0.4903 mN to 19610 mN in the case of a microhardness tester "HM-211" (product of Mitutoyo Corporation)) under a microscope, the obtained measurement value is replaced with the measurement value of an elastic modulus evaluating rubber sheet (such as a commercially available silicone rubber sheet) having the thickness of 1 mm or more, which is prepared as comparison, and the elastic modulus of the elastic modulus evaluating rubber sheet can directly be used as the elastic moduli of transparent adhesive layers 120, 150.

Preferably glass transition temperatures (Tg) of transparent adhesive layers 120, 150 is less than or equal to glass transition temperature (Tg) of first transparent base 110. Consequently, transparent adhesive layers 120, 150 function easily as a kind of stress relaxation layer when first see-through electrode material 101 is bent. Preferably the glass transition temperatures (Tg) of transparent adhesive layers 120, 150 are less than or equal to 150° C., more preferably less than or equal to 100° C. When glass transition temperatures (Tg) of transparent adhesive layers 120, 150 fall within the above range, the elastic moduli of transparent adhesive layers 120, 150 can be decreased around room temperature, and transparent adhesive layers 120, 150 function easily as the stress relaxation layer.

[Reflection Reducing Layers 130, 160]

Reflection reducing layers 130, 160 are formed on surface 140B (hereinafter, referred to as second main surface 140B) of first metal layer 140 on the side facing first transparent base 110 and on surface 170B (hereinafter, referred to as second main surface 170B) of second metal layer 170 on the side facing first transparent base 110. That is, second main surface 140B of first metal layer 140 on the side facing first transparent base 110 and second main surface 170B of second metal layer 170 on the side facing first transparent base 110 are subjected to blackening treatment. Consequently, scattered light caused by natural light, which passes through outer surfaces 120C, 150C and is incident on reflection reducing layers 130, 160, can significantly be reduced in first see-through electrode material 101. First reflection reducing layer 130 and second reflection reducing layer 160 may have the same configuration or different configurations.

Reflection reducing layers 130, 160 are formed such that the surface qualities of surface 130A (hereinafter, referred to as first main surface 130A) on the side of first transparent base 110 of first reflection reducing layer 130 and surface 160A (hereinafter, referred to as first main surface 160A) on the side of first transparent base 110 of second reflection reducing layer 160 follow the surface qualities of second main surface 140B and second main surface 170B. In the case that the thickness of metal layer 140 falls within a range described later, because metal layer 140 is a very thin foil, first main surface 140A becomes a surface following second main surface 140B. That is, kurtoses (Rku) of first main surface 130A and second main surface 130B of first reflection reducing layer 130 (hereinafter, sometimes referred to as main surface 130A, 130B) and kurtoses (Rku) of first main surface 140A and second main surface 140B of first metal layer 140 (hereinafter, sometimes referred to as main surface 140A,140B) can be estimated to be identical to each other. Kurtoses (Rku) of first main surface 160A and second main surface 160B of second reflection reducing layer 160 (hereinafter, sometimes referred to as main surface 160A, 160B) and kurtoses (Rku) of first main surface 170A and second main surface 170B of second metal layer 170 (hereinafter, sometimes referred to as main surface 170A, 170B) can be estimated to be identical to each other. Preferably the thicknesses of reflection reducing layers 130, 160 range from 0.001 μm to 0.50 μm, more preferably range from 0.01 μm to 0.30 μm.

Preferably light reflectances in a visible light region (ranging from 380 nm to 780 nm) of reflection reducing layers 130, 160 are less than or equal to 20%, more preferably less than or equal to 15%, further preferably less than or equal to 10%, particularly less than or equal to 5%. The reflectance in the visible light region is a value measured by a method conforming to JIS K 7375 "Plastics-Determination of Total Luminous Transmittance and Reflectance".

Metals such as copper, nickel, cobalt, tungsten, and aluminum can be used as a material constituting reflection reducing layers 130, 160, and reflection reducing layers 130, 160 may contain sulfur. Wiring resistances of circuit pattern layers 141, 171 can be decreased when metal is the material constituting reflection reducing layers 130, 160. In the case that copper is used as the material for metal layers 140, 170, preferably reflection reducing layers 130, 160 contain at least one kind selected from a group consisting of sulfur, nickel, cobalt, tungsten, and aluminum with content ranging from 0.1% to 10.0% per unit area. This allows prevention of the high light reflectance in wavelengths of 550 nm to 780 nm, which is a feature of the surfaces of metal layers 140, 170 made of copper, and a flat light reflectance can be achieved in the whole range of 380 nm to 780 nm. For this reason, in first see-through electrode material 101, flickering is suppressed in the surface of circuit pattern layers 141, 171, and a contrast ratio can be increased. In this case, preferably the sulfur content is less than or equal to 10%. When the sulfur content falls within the above range, resistance values of circuit pattern layers 141, 171 made of copper are hardly increased. In the case that the material constituting reflection reducing layers 130, 160 is conductive metals such as nickel, cobalt, tungsten, and aluminum, whole first main surface 140A of first metal layer 140 and whole first main surface 170A of second metal layer 170 may be covered with the metals. The sulfur content per unit area is a value (%)

analyzed with an analyzer (mapping results from computer) associated with a commercially available energy dispersive X-ray spectrometer (EDS) or a commercially available wavelength-dispersive X-ray spectrometer (WDS).

In the first exemplary embodiment, first laminate for see-through electrode 100 includes reflection reducing layers 130, 160. However, the present disclosure is not limited to the first exemplary embodiment, but first laminate for see-through electrode 100 may not include reflection reducing layers 130, 160.

[Metal Layers 140, 170]

Metal layers 140, 170 are formed on reflection reducing layers 130, 160. First metal layer 140 and second metal layer 170 may have the same configuration or different configurations.

For example, copper, stainless steel, aluminum, nickel, titanium, tungsten, tin, lead, iron, silver, chromium, or an alloy thereof can be used as a material constituting metal layers 140, 170. Preferably metal layers 140, 170 contain at least one kind selected from a group consisting of copper, nickel, aluminum, and silver. These metals having low specific resistance and excellent malleability and flexibility, and sufficient conduction can be obtained even by a thin wire having line widths of 0.5 μm to 10 μm. Preferably the thicknesses of metal layers 140, 170 range from 0.1 μm to 9.0 μm, more preferably range from 0.3 μm to 5.0 μm. When the thicknesses of metal layers 140, 170 fall within the above range, finely-patterned circuit pattern layers 141, 171 can be formed. Consequently, in first see-through electrode material 101, opening 101C can further be enlarged, and optical transparency of first see-through electrode material 101 can further be improved. The thicknesses of metal layers 140, 170 are a value measured in conformity to the thickness measurement described in Example.

Preferably kurtosis (Rku) of second main surface 140B ranges from 1.00 to 3.10, more preferably ranges from 2.00 to 3.05. Preferably kurtosis (Rku) of second main surface 170B ranges from 1.00 to 3.10, more preferably ranges from 2.00 to 3.05. When kurtosis (Rku) of second main surface 140B falls within the above range, little white turbidity is generated in first outer surface 120C of first see-through electrode material 101, and first see-through electrode material 101 having an excellent see-through property can be obtained. First outer surface 120C in FIG. 2 is formed by removing metal layer 140 and first reflection reducing layer 130 by etching or the like. This is because the surface quality of second main surface 140B of first metal layer 140 is transferred to first outer surface 120C. Even when kurtosis (Rku) of second main surface 170B falls within the above range, little white turbidity is generated in second outer surface 150C of first see-through electrode material 101, and first see-through electrode material 101 having an excellent see-through property can be obtained.

Preferably surface roughnesses (Rz) of main surfaces 140A, 140B range from 0.01 in to 2.0 μm, more preferably ranges from 0.1 μm to 1.5 μm. Preferably surface roughnesses (Rz) of main surfaces 170A, 170B range from 0.01 μm to 2.0 μm, more preferably ranges from 0.1 μm to 1.5 μm. First laminate for see-through electrode 100, in which the disconnection is hardly generated even if first laminate for see-through electrode 100 is bent after the circuit is formed, can be obtained when main surfaces 140A, 170A fall within the above range. When main surfaces 140B, 170B fall within the above range, first laminate for see-through electrode 100 having the further excellent see-through property can be obtained.

A rustproofing treatment layer and a silane coupling treatment layer may be formed on main surfaces 140A, 140B and main surfaces 170A, 170B of metal layers 140, 170. When the rustproofing treatment layer is formed, a change in color of metal layers 140, 170 can be prevented. When the silane coupling treatment layer is formed, adhesive strength between transparent adhesive layers 120, 150 and metal layers 140, 170 can be improved.

For example, zinc plating, zinc alloy plating, tin plating, tin alloy plating, nickel plating, and chromate can be used as the material constituting the rustproofing treatment layer. Preferably the thickness of the rustproofing treatment layer ranges from 0.001 μm to 0.50 μm.

For example, 3-(2-aminoethyl) aminopropyltrimethoxysilane, 3-glycidoxypropyltrimethoxysilane, 3-aminopropyltriethoxysilane, 3-mercaptopropyltrimethoxysilane, or 3-phenylaminopropyltrimethoxysilane can be used as a silane coupling agent constituting the silane coupling treatment layer. Preferably the thickness of the silane coupling treatment layer ranges from 0.001 μm to 0.50 μm.

The reflection reducing layer may be formed on first main surface 140A and on first main surface 170A. That is, the blackening treatment may be subjected to first main surface 140A of first metal layer 140 and first main surface 170A of second metal layer 170. Consequently, first see-through electrode material 101 in which circuit pattern layers 141, 171 are hardly visually recognized can be obtained even if the metal having the high reflectance is used as the material constituting metal layers 140, 170. A material similar to the material illustrated as the material constituting reflection reducing layers 130, 160 can be used as the material constituting the reflection reducing layer.

[See-Through Electrode Material 101 of First Exemplary Embodiment]

As illustrated in FIG. 2, first see-through electrode material 101 differs from first laminate for see-through electrode 100 in that parts of metal layers 140, 170 include circuit pattern layers 141, 171 including openings 101C. In FIG. 2, the same component as that of first laminate for see-through electrode 100 in FIG. 1A is denoted by the same reference mark, and the description will be omitted.

Circuit pattern layers 141, 171 are see-through electric circuits in which metal layers 140, 170 are partially removed by etching or the like to form gaps constituting openings 101C in metal layers 140, 170. Pattern shapes of circuit pattern layers 141, 171 may appropriately be adjusted according to the use of first see-through electrode material 101. For example, a mesh shape, a parallel thin line pattern shape, and a comb shape can be cited.

Openings 101C are regions where metal layers 140, 170 and reflection reducing layers 130, 160 are removed by etching or the like.

Line widths W of circuit pattern layers 141, 171 may appropriately be adjusted according to the use of first see-through electrode material 101. In the case that first see-through electrode material 101 is used as a touch panel sensor, preferably line width W ranges from 0.5 μm to 10 μm, more preferably ranges from 1.0 μm to 8.0 μm. When line width W falls within the above range, opening 101C can widely be enlarged, and transparency of first see-through electrode material 101 can further be improved.

Preferably kurtosis (Rku) of first outer surface 120C ranges from 1.00 to 3.10, more preferably ranges from 2.00 to 3.05. Preferably kurtosis (Rku) of second outer surface 150C ranges from 1.00 to 3.10, more preferably ranges from 2.00 to 3.05. When kurtosis (Rku) of first outer surface 120C and kurtosis (Rku) of second outer surface 150C fall within the above range, turbidity (haze) of transparent adhesive layers 120, 150 is less than or equal to 20% in outer surfaces 120C, 150C, and first see-through electrode material 101 having the excellent see-through property can be obtained. The turbidity (haze) is a value measured with a haze meter.

Preferably a sheet resistance of first see-through electrode material 101 ranges from 0.01 Ω/sq to 50 Ω/sq, more preferably ranges from 0.05 Ω/sq to 10 Ω/sq, further preferably ranges from 0.1 Ω/sq to 5 Ω/sq.

In a mesh (lattice)-shaped circuit having a line width of 3 μm and a line pitch of 500 μm, preferably the total light transmittance of first see-through electrode material 101 is greater than or equal to 60%, more preferably is greater than or equal to 65%, further preferably is greater than or equal to 70%. When the total light transmittance of first see-through electrode material 101 falls within the above range, first see-through electrode material 101 can suitably be used as a touch panel sensor and the like.

For example, first see-through electrode material 101 is suitably used in a touch panel sensor, an electromagnetic wave absorption sheet, and an on-vehicle antenna.

[Device 102 of First Exemplary Embodiment]

Figure 3:
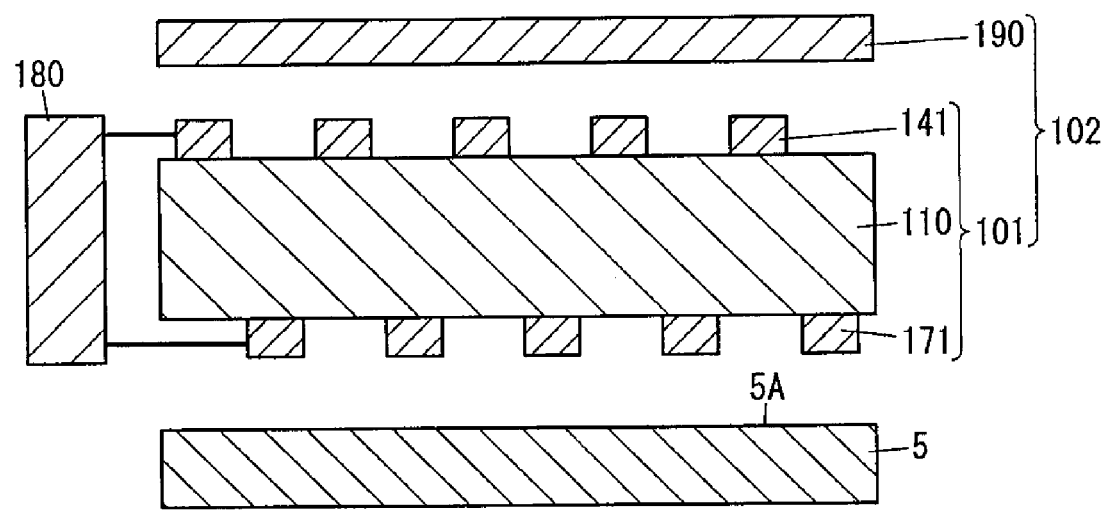
FIG. 3 is an exploded sectional view of a device of the first exemplary embodiment.

FIG. 3 is an exploded sectional view of device 102 (hereinafter, sometimes referred to as first device 102) of the first exemplary embodiment. In FIG. 3, the same component as that of first see-through electrode material 101 in FIG. 2 is denoted by the same reference mark, and the description will be omitted. Transparent adhesive layers 120, 150 and reflection reducing layers 130, 160 are omitted in FIG. 3.

First device 102 is a touch panel sensor of a mutual capacity system that is one kind of a projection type capacitance system. As illustrated in FIG. 3, first device 102 includes first see-through electrode material 101, control circuit 180, and cover 190. Control circuit 180 is electrically connected to circuit pattern layers 141, 171. Cover 190 is attached to a surface on the side of first circuit pattern layer 141 of first see-through electrode material 101.

As illustrated in FIG. 3, first device 102 is disposed on a front side of display surface 5A of image display device 5 and used such that the surface on the side of second circuit pattern layer 171 of first see-through electrode material 101 becomes the side of image display device 5. Known image display devices such as a liquid crystal display panel, a plasma image display panel, an electroluminescence panel, an electronic paper, and a cathode ray tube can be used as image display device 5.

In first device 102, first circuit pattern layer 141 functions as a reception electrode (hereinafter, sometimes referred to as reception electrode 141), and second circuit pattern layer 171 (hereinafter, sometimes referred to as transmission electrode 171) functions as a transmission electrode. That is, in first device 102, when an indicator is brought close to the surface of cover 190, capacitance of a capacitor formed at an intersection point between reception electrode 141 and transmission electrode 171 changes, and control circuit 180 detects the change in capacitance, which allows a position to which the indicator is brought close to be specified. Conductors such as a finger tip of a user, a stylus, and a pointer can be cited as an example of the indicator.

A detection system of first device 102 is the mutual capacity system. However, the present disclosure is not limited to this configuration, but the detection system may be a self-capacity system or a combination of the self-capacity system and the mutual capacity system.

[Method for Producing Laminate for See-Through Electrode 100 of First Exemplary Embodiment]

FIGS. 4A to 4H are schematic explanatory views illustrating a method for producing laminate for see-through electrode 100 of the first exemplary embodiment (hereinafter, referred to as a method for producing first laminate for see-through electrode 100). In FIGS. 4A to 4H, the same component as that of first laminate for see-through electrode 100 in FIG. 1A is denoted by the same reference mark, and the description will be omitted.

The method for producing first laminate for see-through electrode 100 includes first step (a1) of preparing metal layer with first support 14, second step (a2) of preparing transparent base with first transparent adhesive layer 16, and third step (a3) of peeling first support 10 and first peeling layer 11 from first metal layer 140. In the first exemplary embodiment, for example, when first step (a1), second step (a2), and third step (a3) are performed in this order, first single-side laminate for see-through electrode 18 in FIG. 4H is obtained. Subsequently, first laminate for see-through electrode 100 is obtained by performing step s similar to first step (a1), second step (a2), and third step (a3) on second main surface 110B of first single-side laminate for see-through electrode 18.

[First Step (a1)]

First step (a1) includes step (a11) of preparing first support 10, step (a12) of forming first peeling layer 11, step (a13) of forming first metal layer 140, and step (a14) of forming first reflection reducing layer 130. Consequently, metal layer with first support 14 in FIG. 4D is obtained.

The first exemplary embodiment includes step (a14). However, the present disclosure is not limited to the first exemplary embodiment, but step (a14) may not be included.

{Step (a11)}

Figure 4A:
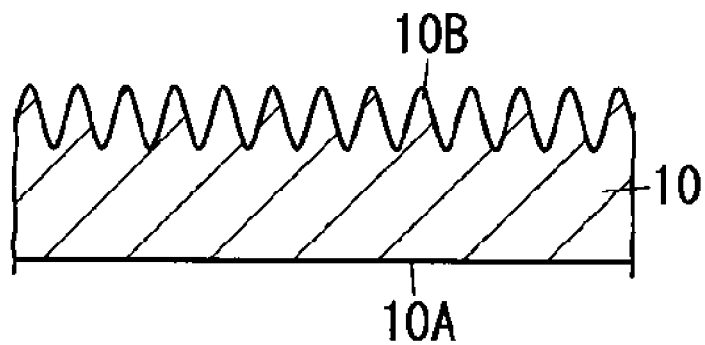
FIG. 4A is a schematic explanatory view illustrating a method for producing the laminate for see-through electrode of the first exemplary embodiment.

In step (a11), as illustrated in FIG. 4A, first support 10 including first main surface 10A and second main surface 10B is prepared. First support 10 functions as a reinforcement (carrier) that backs up thin first metal layer 140 having low mechanical strength until first metal layer 140 adheres to first transparent base 110.

Kurtosis (Rku) of first main surface 10A of first support 10 ranges from 1.00 to 3.10, preferably ranges from 2.00 to 3.05, more preferably ranges from 2.05 to 3.00. When kurtosis (Rku) of first main surface 10A of first support 10 falls within the above range, as described later, kurtosis (Rku) of first main surfaces 140A, 140B of first metal layer 140 can be set in the range of 1.00 to 3.10.

For example, copper, aluminum, stainless steel, iron, titanium, or an alloy thereof can be used as a material constituting first support 10. Preferably copper is used from the viewpoint of cost. For example, an electrolytic copper foil, an electrolytic copper alloy foil, a rolled copper foil, and a rolled copper alloy foil can be used as first support 10 in which copper is used. The thickness of first support 10 is not particularly limited as long as first support 10 functions as the carrier.

Figure 5A:
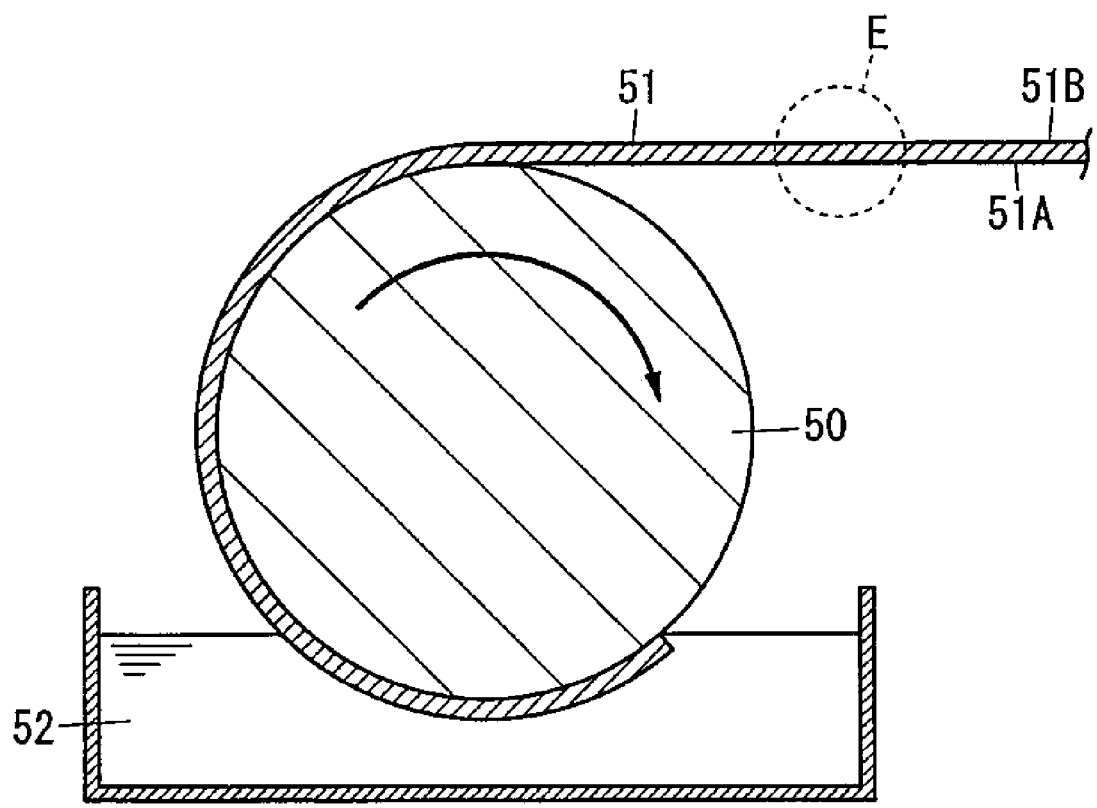
FIG. 5A is a schematic sectional view illustrating an electrolytic metal foil producing method by an electrolytic step in which an electrodeposition drum is used.
Figure 5B:
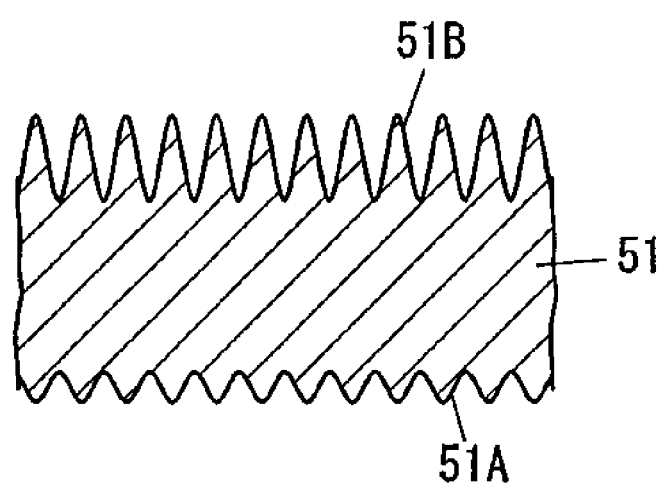
FIG. 5B is an enlarged sectional view of an electrolytic metal foil in an E portion in FIG. 5A.

FIG. 5A is a schematic sectional view illustrating a method for producing electrolytic metal foil 51 by an electrolytic step in which electrodeposition drum 50 is used. FIG. 5B is an enlarged sectional view of electrolytic metal foil 51 in an E portion in FIG. 5A.

For example, method (a110) and method (a120) can be cited as a method for preparing first support 10. In method (a110), electrolytic metal foil 51 including first main surface 51A on the side contacting with electrodeposition drum 50 and second main surface 51B on the side that does not contact with electrodeposition drum 50 is prepared by an electrolytic step in which electrodeposition drum 50 is used, and first main surface 51A of electrolytic metal foil 51 is subjected to smoothing treatment to prepare first support 10. In method (a120), electrolytic metal foil 51 in which second main surface 51B is smoothed is prepared using a predetermined electrolyte tank in which an additive agent and the like are added by the electrolytic step in which electrodeposition drum 50 is used, and first support 10 is prepared. In method (a110), first main surface 51A of electrolytic metal foil 51 corresponds to first main surface 10A of support 10, and second main surface 51B of electrolytic metal foil 51 corresponds to second main surface 10B of support 10. In method (a120), first main surface 51A of electrolytic metal foil 51 corresponds to second main surface 10B of support 10, and second main surface 51B of electrolytic metal foil 51 corresponds to first main surface 10A of support 10.

<Method for Preparing First Support 10 (a110)>

For example, as illustrated in FIG. 5A, the following method can be cited as a method for preparing electrolytic metal foil 51. That is, electrodeposition drum 50 is used as the negative electrode while a frame (not illustrated) having an arc shape in section opposed to electrodeposition drum 50 is used as the positive electrode, electrodeposition drum 50 is immersed in electrolyte tank 52, current is passed between the positive electrode and the negative electrode while electrodeposition drum 50 is rotated, electrolytic metal foil 51 having a predetermined thickness is electrodeposited on the surface of electrodeposition drum 50, and electrolytic metal foil 51 is peeled off from electrodeposition drum 50, thereby continuously preparing electrolytic metal foil 51.

Typically kurtosis (Rku) of first main surface 51A of electrolytic metal foil 51 is greater than 3.10. This is attributed to the following reason. That is, the surface quality of electrodeposition drum 50 is transferred to first main surface 51A of electrolytic metal foil 51 because electrolytic metal foil 51 is directly electrodeposited on the surface of electrodeposition drum 50, and the surface of electrodeposition drum 50 is polished and the polishing trace remains because electrodeposited electrolytic metal foil 51 is peeled off from the surface of electrodeposition drum 50. Typically kurtosis (Rku) of electrodeposition drum 50 in which the surface is polished is greater than 3.10. Typically kurtosis (Rku) of first main surface 51A of electrolytic metal foil 51 is smaller than kurtosis (Rku) of second main surface 51B of electrolytic metal foil 51.

For example, copper can be used as a material for electrolytic metal foil 51. For example, titanium can be used as a material constituting electrodeposition drum 50. In the case that the material for electrolytic metal foil 51 is copper, copper sulfate solution can be used as an electrolytic solution in electrolyte tank 52. An electrolysis condition is not particularly limited as long as first support 10 is obtained by subjecting first main surface 51A and second main surface 51B of electrolytic metal foil 51 to the smoothing treatment.

For example, method (a111) by electroplating, method (a112) by electrochemical polishing, method (a113) by chemical polishing, and a method by mechanical polishing can be cited as a method for subjecting electrolytic metal foil 51 to the smoothing treatment.

(Method by Electroplating (a111))

In method (a111) by electroplating, an electroplated coating is electrodeposited on first main surface 51A of electrolytic metal foil 51 prepared by method (a110).

For example, the following method can be cited as method (a111) by electroplating. That is, electrolytic metal foil 51 is disposed as the negative electrode (cathode) in the electrolytic solution while a conductive plate is disposed as the positive electrode (anode), electrolytic metal foil 51 and the conductive plate are electrically connected to a power supply to pass current through electrolytic metal foil 51 and the conductive plate, and metal is deposited on the surface of first main surface 51A.

For example, "K-500" (product of TDK Corporation) can be cited as the conductive plate. The electrolytic solution may appropriately be selected according to the material constituting the electrolytic metal foil 51 as long as the metal having purity similar to that of electrolytic metal foil 51 can be electrodeposited using the electrolytic solution. For example, a copper sulfate solution can be used in the case that the material constituting electrolytic metal foil 51 is copper.

In order to set kurtosis (Rku) of first main surface 10A (corresponding to first main surface 51A of electrolytic metal foil 51 prepared by method (a110)) of first support 10 in the above range, a surface state of first main surface 51A of electrolytic metal foil 51 may be adjusted by appropriately adjusting a step condition of a kind of the step solution. For example, a commercially available additive agent generally used as a brightener can be used. Preferably a brightener containing sulfur is used, more preferably a brightener including a mercapto group is used. For example, 3-mercapto-1-propanesulfonic acid can be used as the brightener including the mercapto group. By adding an organic compound or a linear polymer including a plurality of hydroxyl groups in the brightener, action of the brightener can be improved, and the smooth, excellent-gloss surface having no protrusion can be formed. For example, polyethylene glycol having mean molecular weights (weight average) of 500 to 5,000,000 can be used as the organic compound or linear polymer including the plurality of hydroxyl groups.

(Method by Chemical Polishing (a112))

In method (a112) by electrochemical polishing, first main surface 51A of electrolytic metal foil 51 prepared by method (a110) is polished by electrochemical polishing.

For example, the following method can be cited as the method for performing the electrochemical polishing. That is, electrolytic metal foil 51 is disposed as the negative electrode (cathode) in the electropolishing solution, the conductive plate is disposed as the positive electrode (anode) so as to be opposed to first main surface 51A of electrolytic metal foil 51, electrolytic metal foil 51 and the conductive plate are electrically connected to the power supply to pass the current through electrolytic metal foil 51 and the conductive plate, and the surface of first main surface 51A is dissolved. In this method, irregularities exist in the surface of electrolytic metal foil 51, so that dissolution current is easily passed through a protrusion of the irregularities to preferentially dissolve the protrusion.

For example, platinum, titanium, and stainless steel (SUS) can be used as the material constituting the conductive plate. The electropolishing solution may appropriately be adjusted according to the material constituting electrolytic metal foil 51. For example, an acidic solution containing sulfuric acid, hydrochloric acid, phosphoric acid, or nitric acid or an alkaline solution containing cyanogen, a sodium hydroxide, potassium hydroxide, or pyrophosphoric acid can be used as the electropolishing solution.

In order to set kurtosis (Rku) of first main surface 10A (corresponding to first main surface 51A of electrolytic metal foil 51 prepared by method (a110)) of first support 10 in the above range, the step condition may appropriately be adjusted by the surface state of first main surface 51A and the kind of the step solution. For example, current density is properly set less than or equal to 10 A/dm$^2$, the positive electrode and the negative electrode of the electroplating are reversed, and acid etching may be performed in sulfuric acid having a proper concentration of 20% or less while the current is passed.

(Method by Chemical Polishing (a113))

In method (a113) by chemical polishing, first main surface 51A of electrolytic metal foil 51 prepared by method (a110) is polished by chemical polishing.

In the method for performing the chemical polishing, first main surface 51A of electrolytic metal foil 51 is immersed in the step solution, and the surface of first main surface 51A is dissolved by a chemical reaction. The step solution may appropriately be adjusted according to the material constituting electrolytic metal foil 51. For example, an acidic solution containing sulfuric acid, hydrochloric acid, phosphoric acid, or nitric acid or an alkaline solution containing cyanogen, a sodium hydroxide, potassium hydroxide, or pyrophosphoric acid can be used as the electropolishing solution.

In order to set kurtosis (Rku) of first main surface 10A of first support 10 (corresponding to first main surface 51A of electrolytic metal foil 51 prepared by method (a110)) in the above range, the step condition may appropriately be adjusted by the surface state of first main surface 10A and the kind of the step solution. For example, the acid etching may be performed in sulfuric acid having a proper concentration less than or equal to 20% while the sulfuric acid is stirred.

<Method for Preparing First Support 10 (a120)>

Method (a120) by electroplating is similar to the method for preparing electrolytic metal foil 51 in method (a110) except that the additive agent and the like are added in electrolyte tank 52 during the electrodeposition to electrodeposition drum 50. By adding the additive agent and the like in electrolyte tank 52 during the electrodeposition to electrodeposition drum 50, kurtosis (Rku) of second main surface 51B (corresponding to first main surface 10A of first support 10) of electrolytic metal foil 51 can be set less than or equal to 3.10. For example, ethylene glycol can be used as the additive agent.

{Step (a12)}

Figure 4B:
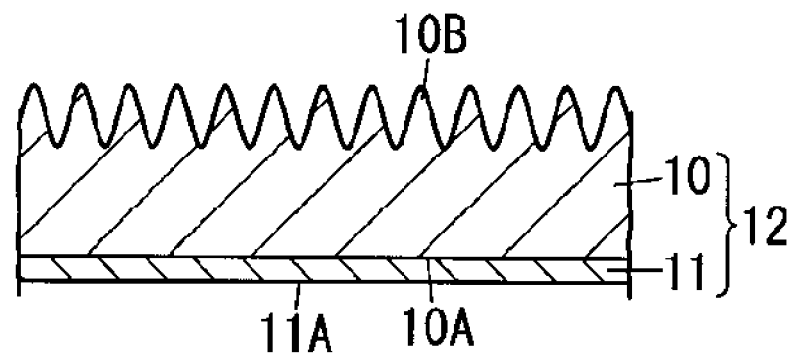
FIG. 4B is a schematic explanatory view illustrating the method for producing the laminate for see-through electrode of the first exemplary embodiment.

In step (a12), as illustrated in FIG. 4B, first peeling layer 11 is formed on first main surface 10A. Consequently, first laminate 12 is obtained.

For example, nickel, molybdenum, chromium, iron, titanium, tungsten, phosphorous, or an alloy thereof can be used as the material constituting first peeling layer 11.

The surface quality of main surface 11A of first peeling layer 11 on the side on which first metal layer 140 is formed follows the surface quality of first main surface 10A of first support 10. That is, kurtosis (Rku) of main surface 11A of first peeling layer 11 on the side on which first metal layer 140 is formed can be estimated to be identical to kurtosis (Rku) of first main surface 10A of first support 10. Preferably a deposition amount of the metal constituting first peeling layer 11 ranges from 0.001 m to 0.50 μm.

For example, the electroplating can be cited as the method for forming the peeling layer.

{Step (a13)}

Figure 1B:
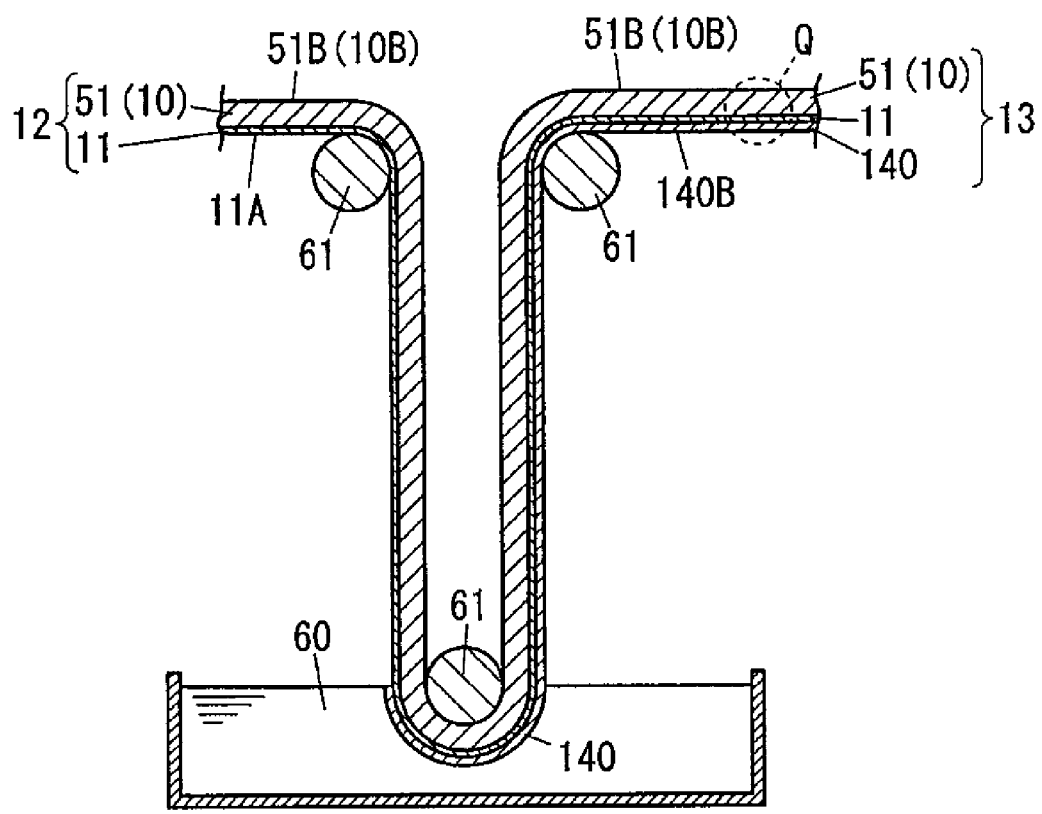
FIG. 1B is a schematic explanatory view illustrating a first method for producing a second laminate of the first exemplary embodiment.
Figure 1C:
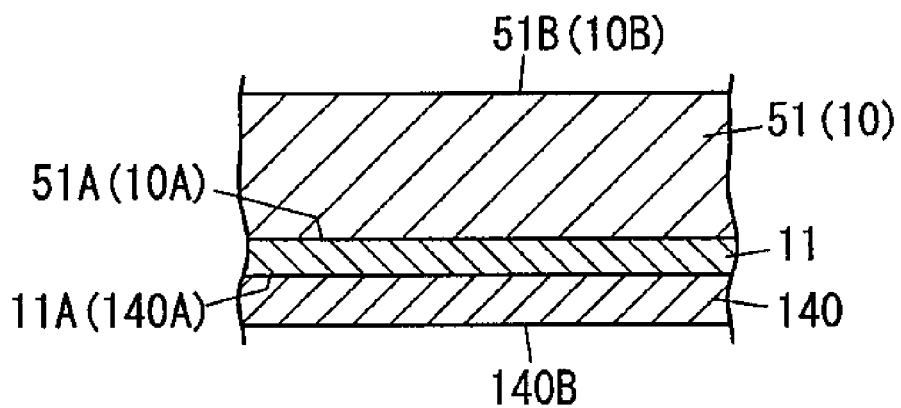
FIG. 1C is an enlarged sectional view of a Q portion in FIG. 1B.
Figure 6A:
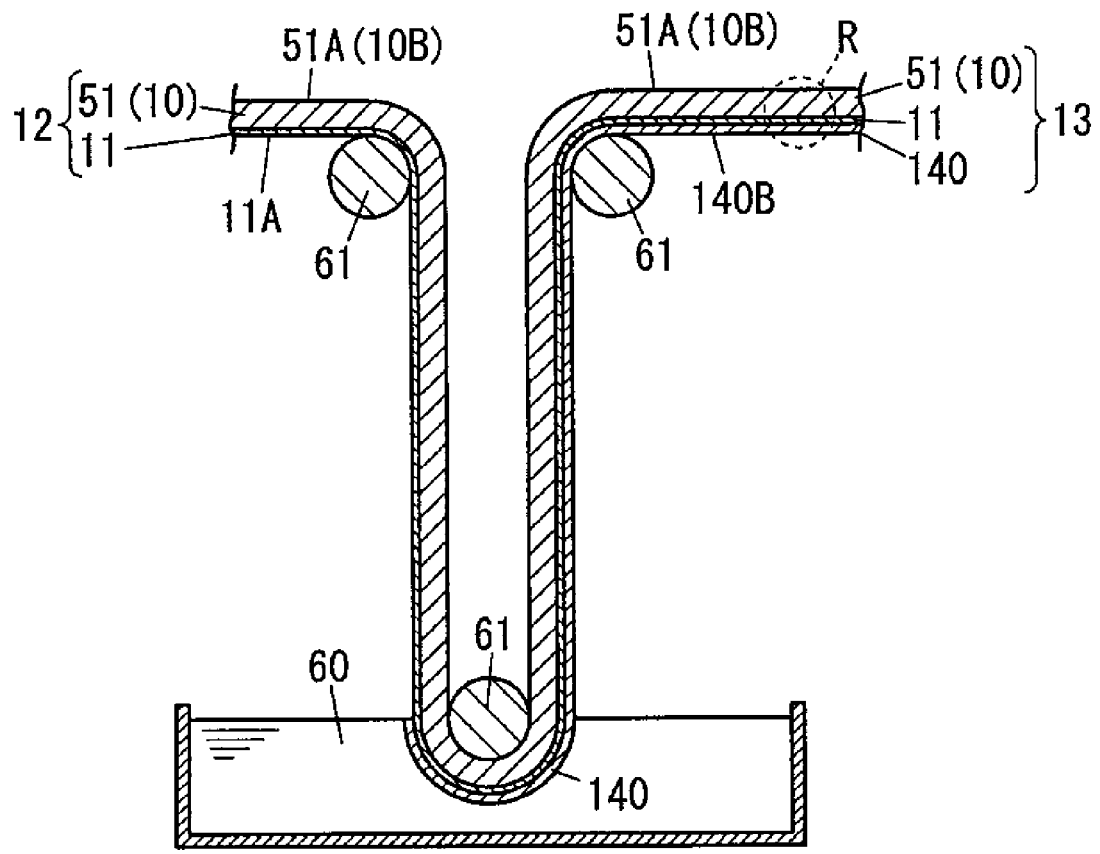
FIG. 6A is a schematic explanatory view illustrating a second method for producing the second laminate of the first exemplary embodiment.
Figure 6B:
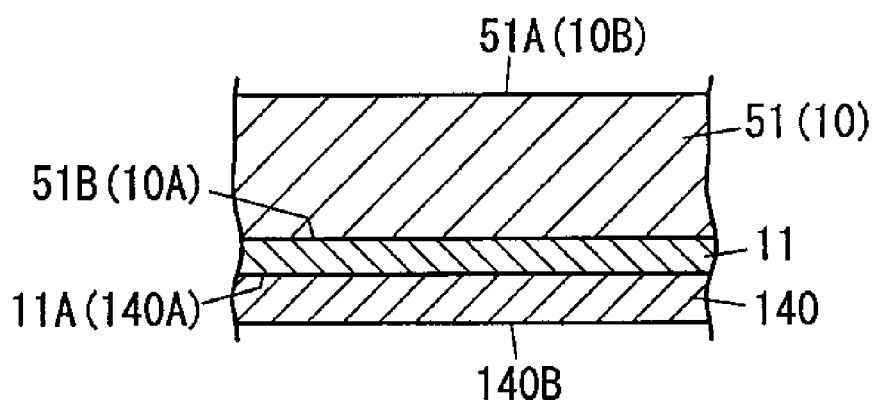
FIG. 6B is an enlarged sectional view of an R portion in FIG. 6A.

FIG. 1B is a schematic explanatory view illustrating a first method for producing the second laminate of the first exemplary embodiment, and FIG. 1C is an enlarged sectional view of a Q portion in FIG. 1B. FIG. 6A is a schematic explanatory view illustrating a second method for producing the second laminate of the first exemplary embodiment, and FIG. 6B is an enlarged sectional view of an R portion in FIG. 6A. In FIGS. 1B and 6A, the reference mark 61 denotes a conveyance roller.

Figure 4C:
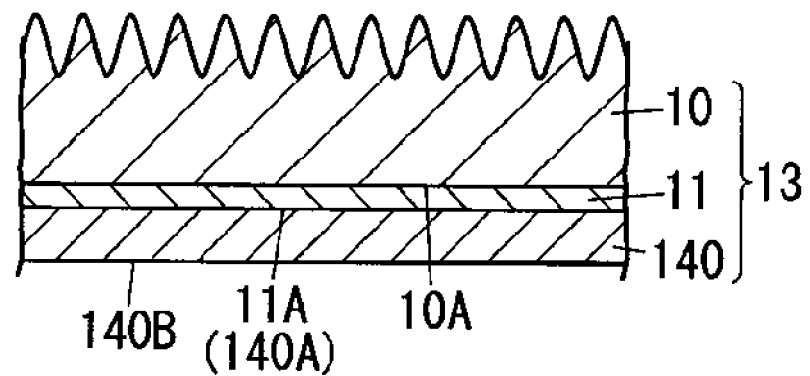
FIG. 4C is a schematic explanatory view illustrating the method for producing the laminate for see-through electrode of the first exemplary embodiment.
Figure 4D:
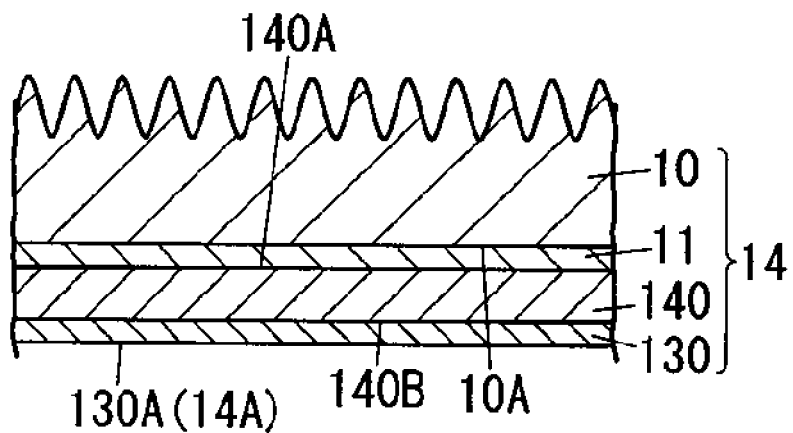
FIG. 4D is a schematic explanatory view illustrating the method for producing the laminate for see-through electrode of the first exemplary embodiment.

In step (a13), as illustrated in FIG. 4C, first metal layer 140 is formed on first peeling layer 11 by electroplating. Consequently, second laminate 13 is obtained. In this way, first metal layer 140 is directly formed on first peeling layer 11. For this reason, kurtosis (Rku) of first main surface 140A of first metal layer 140 and kurtosis (Rku) of main surface 11A of first peeling layer 11 on the side on which first metal layer 140 is formed can be estimated to be identical to each other. In other words, kurtosis (Rku) of first main surface 140A of first metal layer 140 and kurtosis (Rku) of first main surface 10A of first support 10 can be estimated to be identical to each other.

For example, the following two methods can be cited as the method for forming first metal layer 140. In one of the methods, in the case that electrolytic metal foil 51 is prepared by method (a110) (first main surface 51A is the smooth surface), as illustrated in FIG. 1B, electrolytic metal foil 51 (first support 10) is used as the negative electrode to immerse first laminate 12 in electrolyte tank 60, and the current is passed between the positive electrode and the negative electrode to electrodeposit first metal layer 140 on the surface (the surface of peeling layer 11) on the side of first main surface 51A (first main surface 10A of first support 10) of electrolytic metal foil 51. In the other method, in the case that electrolytic metal foil 51 is prepared by method (a120) (second main surface 51B is the smooth surface), as illustrated in FIG. 6A, electrolytic metal foil 51 (first support 10) is used as the negative electrode to immerse first laminate 12 in electrolyte tank 60, and the current is passed between the positive electrode and the negative electrode to electrodeposit first metal layer 140 on the surface (the surface of peeling layer 11) on the side of second main surface 51B (first main surface 10A of first support 10) of electrolytic metal foil 51.

Electrolyte tank 60 may appropriately be adjusted according to the material constituting first metal layer 140. In the case that copper is used as the material constituting first metal layer 140, a copper sulfate plating bath, a copper cyanides plating bath, a boron-copper fluoride plating bath, a copper pyrophosphate plating bath, or a copper sulfamate plating bath can be used as electrolyte tank 60.

In the case that copper is used as the material constituting first metal layer 140, a copper strike plating layer is formed on first peeling layer 11 by the electroplating, and preferably first metal layer 140 is formed on the copper strike plating layer. Consequently, the plating can more uniformly be performed on first peeling layer 11, and a number of pinholes of first metal layer 140 can significantly be decreased. For example, a copper pyrophosphate plating bath or a copper cyanides plating bath can be used as a plating bath used to form the copper strike plating layer. For example, a copper sulfate plating bath, a boron-copper fluoride plating bath, a copper pyrophosphate plating bath, a copper sulfamate plating bath, or a copper cyanides plating bath can be used as a plating bath used to form first metal layer 140 on the copper strike plating layer. Preferably the thickness of the copper strike plating layer ranges from 0.001 μm to 1 μm.

The surface quality of second main surface 140B of first metal layer 140 follows the surface quality of first main surface 11A of first peeling layer 11. That is, the surface quality of second main surface 140B of first metal layer 140 follows the surface quality of first surface 10A of first support 10. Consequently, kurtosis (Rku) of first main surface 140A of first metal layer 140 falls within the range of 1.00 to 3.10.

{Step (a14)}

In step (a14), as illustrated in FIG. 4D, first reflection reducing layer 130 is formed on second main surface 140B of first metal layer 140. That is, first metal layer 140 formed on first peeling layer 11 is subjected to the blackening treatment. Consequently, metal layer with first support 14 is obtained.

For example, electroplating can be cited as the method for forming first reflection reducing layer 130. The plating bath used in the electroplating may appropriately be adjusted according to the material constituting first reflection reducing layer 130. For example, nickel citrate plating bath can be used.

[Second Step (a2)]

Figure 4E:
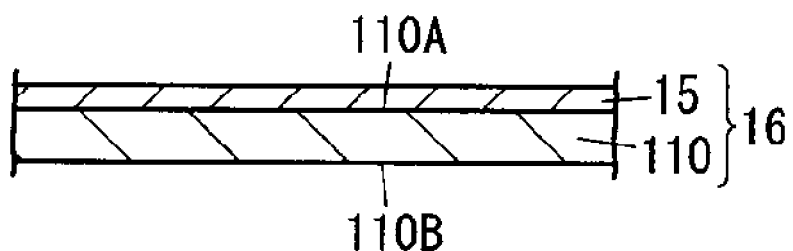
FIG. 4E is a schematic explanatory view illustrating the method for producing the laminate for see-through electrode of the first exemplary embodiment.

In second step (a2), as illustrated in FIG. 4E, first transparent base 110 is prepared, and first transparent adhesive layer 15 is formed on first main surface 110A of first transparent base 110. Consequently, transparent base with first transparent adhesive layer 16 is prepared. When first transparent adhesive layer 15 is cured, first transparent adhesive layer 15 becomes first transparent adhesive layer 120.

A method for applying a transparent adhesive onto first main surface 110A can be cited as the method for forming first transparent adhesive layer 15.

[Third Step (a3)]

Third step (a3) includes step (a31) of bonding metal layer with first support 14 and transparent base with first transparent adhesive layer 16 together and step (a32) of peeling off first support 10 and first peeling layer 11 from first metal layer 140. Consequently, first single-side laminate for see-through electrode 18 is obtained.

{Step (a31)}

In step (a31), surface 14A of metal layer with first support 14 (hereinafter, referred to as first main surface 14A) on the side of first metal layer 140 and surface 16A of transparent base with first transparent adhesive layer 16 (hereinafter, referred to as first main surface 16A) on the side of first transparent adhesive layer 15 are bonded together. Consequently, third laminate 17 in FIG. 4G is obtained.

Figure 4F:
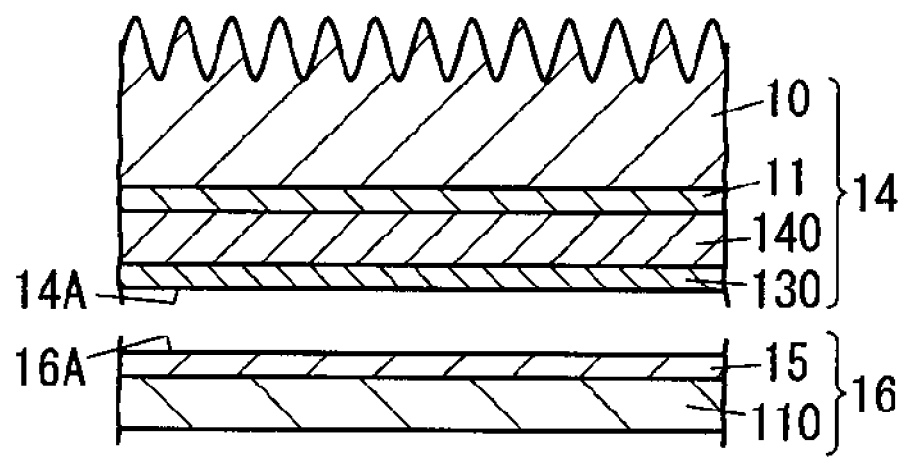
FIG. 4F is a schematic explanatory view illustrating the method for producing the laminate for see-through electrode of the first exemplary embodiment.
Figure 4G:
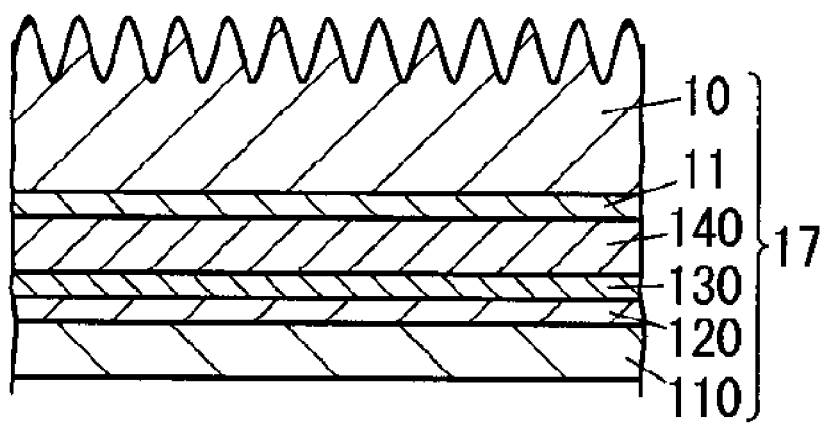
FIG. 4G is a schematic explanatory view illustrating the method for producing the laminate for see-through electrode of the first exemplary embodiment.
Figure 4H:
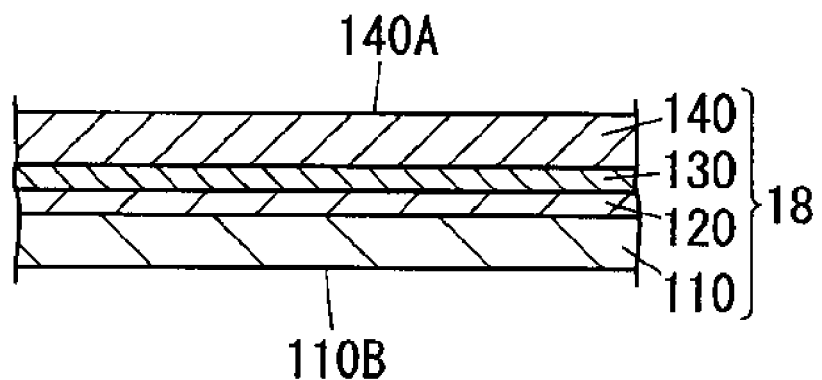
FIG. 4H is a schematic explanatory view illustrating the method for producing the laminate for see-through electrode of the first exemplary embodiment.

As to the bonding method, for example, as illustrated in FIG. 4F, first transparent adhesive layer 15 may be cured after first main surface 14A of metal layer with first support 14 and first main surface 16A of transparent base with first transparent adhesive layer 16 are opposed to each other. Consequently, first transparent adhesive layer 15 is cured, and first transparent adhesive layer 15 becomes first transparent adhesive layer 120.

The method for curing first transparent adhesive layer 15 may appropriately be adjusted according to the transparent adhesive constituting first transparent adhesive layer 15. For example, a method for heating while applying predetermined pressure using a press machine or a method for performing heating in an environment of normal pressure or low pressure.

{Step (a32)}

In step (a32), first support 10 and first peeling layer 11 are peeled off from first metal layer 140 in third laminate 17 in FIG. 4G in which metal layer with first support 14 and transparent base with first transparent adhesive layer 16 are bonded together. At this point, when first support 10 is peeled off, first peeling layer 11 is peeled off from first metal layer 140 together with first support 10. Consequently, first single-side laminate for see-through electrode 18 in FIG. 4H is obtained.

[Laminate for See-Through Electrode 200 of Second Exemplary Embodiment]

Figure 7:
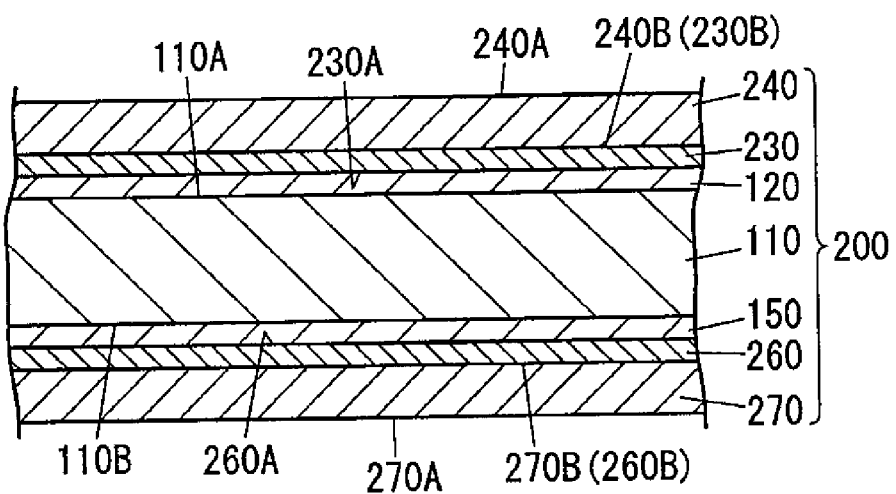
FIG. 7 is a sectional view in a thickness direction of a laminate for see-through electrode according to a second exemplary embodiment.
Figure 8:
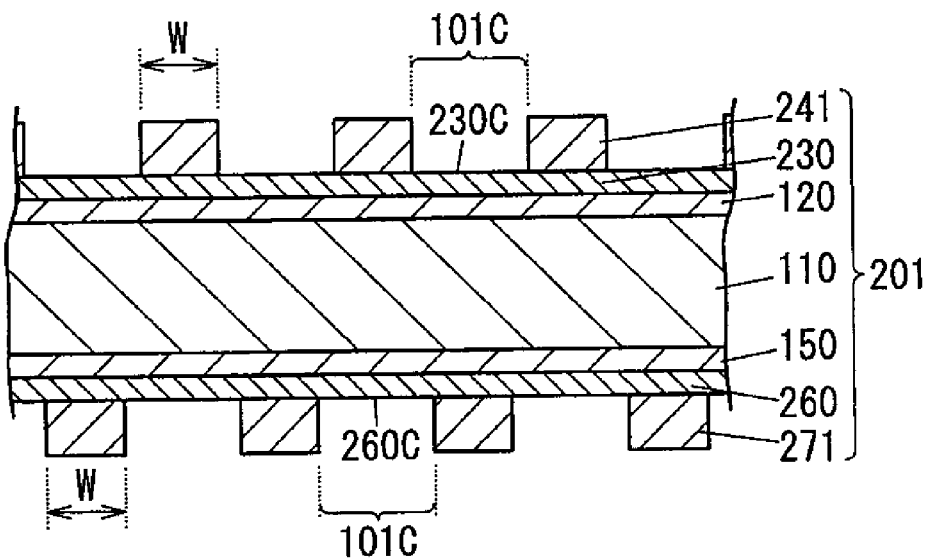
FIG. 8 is a sectional view in a thickness direction of a material for see-through electrode of the second exemplary embodiment.

FIG. 7 is a sectional view in a thickness direction of laminate for see-through electrode 200 of the second exemplary embodiment (hereinafter, referred to as second laminate for see-through electrode 200). FIG. 8 is a sectional view in a thickness direction of see-through electrode material 201 of the second exemplary embodiment (hereinafter, referred to as second see-through electrode material 201). In FIG. 7, the same component as that of first laminate for see-through electrode 100 in FIG. 1A is denoted by the same reference mark, and the description will be omitted. In FIG. 8, the same component as that of second see-through electrode material 201 in FIG. 7 is denoted by the same reference mark, and the description will be omitted.

In FIG. 7, the reference mark 200 denotes the second laminate for see-through electrode, the reference mark 230 denotes a first heat-resistant layer, the reference mark 240 denotes a third metal layer, the reference mark 260 denotes a second heat-resistant layer, and the reference mark 270 denotes a fourth metal layer. In FIG. 8, the reference mark 230C denotes a third outer surface corresponding to opening 101C of first heat-resistant layer 230, the reference mark 260C denotes a second outer surface corresponding to opening 101C of second heat-resistant layer 260, the reference mark 241 denotes a third circuit pattern layer, and the reference mark 271 denotes a fourth circuit pattern layer.

As illustrated in FIG. 7, second laminate for see-through electrode 200 includes first transparent base 110, first transparent adhesive layer 120, first heat-resistant layer 230, third metal layer 240, second transparent adhesive layer 150, second heat-resistant layer 260, and fourth metal layer 270. First transparent adhesive layer 120, first heat-resistant layer 230, and third metal layer 240 are laminated on first main surface 110A of first transparent base 110 in this order. Second transparent adhesive layer 150, second heat-resistant layer 260, and fourth metal layer 270 are laminated on first main surface 110B of first transparent base 110 in this order. Hereinafter, sometimes first heat-resistant layer 230 and second heat-resistant layer 260 are simply referred to as heat-resistant layers 230, 260. Sometimes third metal layer 240 and fourth metal layer 270 are referred to as metal layers 240, 270. Sometimes third circuit pattern layer 241 and fourth circuit pattern layer 271 are referred to as circuit pattern layers 241, 271.

In the second exemplary embodiment, kurtosis (Rku) of surface 240A of third metal layer 240 (hereinafter, sometimes referred to as first main surface 240A) on the opposite side to the side facing first transparent base 110 ranges from 1.00 to 3.10, preferably ranges from 2.00 to 3.05, more preferably ranges from 2.00 to 3.00. Kurtosis (Rku) of surface 270A of fourth metal layer 270 (hereinafter, sometimes referred to as first main surface 270A) on the opposite side to the side facing first transparent base 110 ranges from 1.00 to 3.10, preferably ranges from 2.00 to 3.05, more preferably ranges from 2.00 to 3.00. When kurtosis (Rku) of first main surface 240A and kurtosis (Rku) of first main surface 270A fall within the above range, circuit pattern layers 241, 271 are hardly disconnected even if second see-through electrode material 201 is bent.

[Heat-Resistant Layers 230, 260]

Heat-resistant layers 230, 260 are formed on second main surface 240B on the opposite side to first main surface 240A of third metal layer 240 and on second main surface 270B on the opposite side to first main surface 270A of fourth metal layer 270. Consequently, in a step of producing second laminate for see-through electrode 200, generation of a flaw of second support 20 (to be described later) can be prevented. First heat-resistant layer 230 and second heat-resistant layer 260 may have the same configuration or different configurations.

Heat-resistant layers 230, 260 are formed such that the surface qualities of surface (hereinafter, referred to as first main surface 230A) on the side of first transparent base 110 of first heat-resistant layer 230 and surface (hereinafter, referred to as first main surface 260A) on the side of first transparent base 110 of second heat-resistant layer 260 follow the surface qualities of second main surface 240B and second main surface 270B. That is, kurtosis (Rku) of first main surface 230A of first heat-resistant layer 230 can be estimated to be identical to kurtosis (Rku) of second main surface 240B of third metal layer 240. That is, kurtosis (Rku) of first main surface 260A of second heat-resistant layer 260 can be estimated to be identical to kurtosis (Rku) of second main surface 270B of fourth metal layer 270. Preferably the thicknesses of heat-resistant layers 230, 260 range from 0.001 µm to 3 µm, more preferably range from 0.001 µm to 0.5 µm.

Kurtosis (Rku) of surface 230B of first heat-resistant layer 230 (hereinafter, referred to as second main surface 230B) on the opposite side to the side of first transparent base 110 ranges from 1.00 to 3.10, preferably ranges from 2.00 to 3.05, more preferably ranges from 2.00 to 3.00. Kurtosis (Rku) of surface 260B of second heat-resistant layer 260 (hereinafter, referred to as second main surface 260B) on the opposite side to the side of first transparent base 110 ranges from 1.00 to 3.10, preferably ranges from 2.00 to 3.05, more preferably ranges from 2.00 to 3.00. When kurtosis (Rku) of second main surface 230B falls within the above range, little white turbidness is generated in outer surface 230C of second see-through electrode material 201, and second see-through electrode material 201 having the excellent see-through property can be obtained. Even when kurtosis (Rku) of second main surface 270B falls within the above range, little white turbidness is generated in third outer surface 260C of second see-through electrode material 201, and second see-through electrode material 201 having the excellent see-through property can be obtained.

Curable resins such as a two-component reaction type resin, a thermosetting resin, and an ionizing radiation curable resin can be used as the material constituting heat-resistant layers 230, 260.

For example, preferably the two-component reaction type resin contains an isocyanate compound and an isocyanate reactive resin including a hydroxyl group reacting with the isocyanate compound. Consequently, the isocyanate compound and the isocyanate reactive resin react with each other to obtain a hardened material. For example, tolylene diisocyanate, 4, 4'-diphenyl methane diisocyanate, xylylene diisocyanate, or 1, 5-naphthylene diisocyanate can be used as the isocyanate compound. For example, an isocyanate reactive cellulosic resin, an isocyanate reactive acetal resin, an isocyanate reactive vinyl resin, an isocyanate reactive acrylic resin, an isocyanate reactive phenoxy resin, or an isocyanate reactive styrene resin can be used as the isocyanate reactive resin.

In the second exemplary embodiment, second laminate for see-through electrode 200 includes heat-resistant layers 230, 260. However, the present disclosure is not limited to the second exemplary embodiment, but second laminate for see-through electrode 200 may not include heat-resistant layers 230, 260.

[Metal Layers 240, 270]

Metal layers 240, 270 are formed on heat-resistant layers 230, 260.

Third metal layer 240 and fourth metal layer 270 may have the same configuration or different configurations.

Third metal layer 240 includes first main surface 240A and second main surface 240B on the opposite side to first main surface 240A. Fourth metal layer 270 includes first main surface 270A and second main surface 270B on the opposite side to first main surface 270A.

Metal layers 240, 270 are formed by physical vapor deposition. For example, copper, stainless steel, aluminum, nickel, silver, gold, chromium, cobalt, tin, zinc, brass, or an alloy thereof can be used as the material constituting metal layers 240, 270. Preferably metal layers 240, 270 contain at least one kind selected from a group consisting of copper, nickel, aluminum, and silver.

Preferably the thicknesses of metal layers 240, 270 range from 0.1 µm to 9.0 µm, more preferably range from 0.1 µm to 3.0 µm, further preferably range from 0.2 µm to 1.0 µm. When the thicknesses of metal layers 240, 270 fall within the above range, finely-patterned circuit pattern layers 241, 271 can be formed. Consequently, in second see-through electrode material 201, opening 101C can further be enlarged, and optical transparency of second see-through electrode material 201 can further be improved.

Preferably kurtosis (Rku) of second main surface 240B ranges from 1.00 to 3.10, more preferably ranges from 2.00 to 3.05. Preferably kurtosis (Rku) of second main surface 270B ranges from 1.00 to 3.10, more preferably ranges from 2.00 to 3.05.

Preferably surface roughnesses (Rz) of first main surface 240A and second main surface 240B range from 0.01 µm to 2.0 µm, more preferably ranges from 0.1 µm to 1.5 µm. Preferably surface roughnesses (Rz) of first main surface 270A and second main surface 270B range from 0.01 µm to 2.0 µm, more preferably ranges from 0.1 µm to 1.5 µm. Second laminate for see-through electrode 200, in which the disconnection is hardly generated even if second laminate for see-through electrode 200 is bent after the circuit is formed, can be obtained when main surfaces 240A, 270A fall within the above range. When main surfaces 240B, 270B fall within the above range, second laminate for see-through electrode 200 having the further excellent see-through property can be obtained.

The reflection reducing layer may be formed on first main surface 240A and on first main surface 270A. That is, the blackening treatment may be subjected to first main surface 240A of third metal layer 240 and first main surface 270A of fourth metal layer 270. Consequently, second see-through electrode material 201 in which circuit pattern layers 241, 271 are hardly visually recognized can be obtained even if the metal having the high reflectance is used as the material constituting metal layers 240, 270. A material similar to the material illustrated as the material constituting reflection reducing layers 130, 160 can be used as the material constituting the reflection reducing layer.

[See-Through Electrode Material 201 of Second Exemplary Embodiment]

As illustrated in FIG. 8, second see-through electrode material 201 differs from second laminate for see-through electrode 200 in that parts of metal layers 240, 270 include circuit pattern layers 241, 271 including openings 101C. In FIG. 8, the same component as that of second laminate for see-through electrode 200 in FIG. 7 is denoted by the same reference mark, and the description will be omitted.

Circuit pattern layers 241, 271 are see-through electric circuits in which metal layers 240, 270 are partially removed by etching or the like to form gaps constituting openings 101C in metal layers 240, 270. The pattern shapes of circuit pattern layers 241, 271 may appropriately be adjusted according to the use of second see-through electrode material 201. For example, a mesh shape, a parallel thin line pattern shape, and a comb shape can be cited.

Preferably the sheet resistance of second see-through electrode material 201 ranges from 0.01 Ω/sq to 50 Ω/sq, more preferably ranges from 0.05 Ω/sq to 10 Ω/sq, further preferably ranges from 0.1 Ω/sq to 5 Ω/sq.

Preferably the total light transmittance of second see-through electrode material 201 is greater than or equal to 60%, more preferably is greater than or equal to 65%, further preferably is greater than or equal to 70%. When the total light transmittance of second see-through electrode material 201 falls within the above range, second see-through electrode material 201 can suitably be used as a touch panel sensor and the like. The total light transmittance is a value measured with a haze meter.

For example, second see-through electrode material 201 is suitably used in a touch panel sensor, an electromagnetic wave absorption sheet, and an on-vehicle antenna.

[Method for Producing Second Laminate for See-Through Electrode 200 of Second Exemplary Embodiment]

FIGS. 9A to 9I are schematic explanatory views illustrating a method for producing laminate for see-through electrode 200 of the second exemplary embodiment (hereinafter, referred to as a method for producing second laminate for see-through electrode 200). In FIGS. 9A to 9I, the same component as that in FIGS. 4A to 4H is denoted by the same reference mark, and the description will be omitted.

The method for producing second laminate for see-through electrode 200 includes first step (b1) of preparing metal layer with first support 26, second step (b2) of preparing transparent base with transparent adhesive layer 16, and third step (b3) of peeling off second support 20, third heat-resistant layer 21, and second peeling layer 23 from third metal layer 240. In the second exemplary embodiment, for example, when first step (b1), second step (b2), and third step (b3) are performed in this order, second single-side laminate for see-through electrode 28 in FIG. 9I is obtained. Subsequently, second laminate for see-through electrode 200 is obtained by performing step s similar to first step (b1), second step (b2), and third step (b3) on second main surface 110B of second single-side laminate for see-through electrode 28.

[First Step (b1)]

First step (b1) includes step (b11) of preparing second support 20, step (b12) of forming third heat-resistant layer 21, step (b13) of forming second peeling layer 23, step (b14) of forming third metal layer 240, and step (b15) of forming first heat-resistant layer 230. Consequently, metal layer with second support 26 in FIG. 9E is obtained. The second exemplary embodiment includes step (b15). However, the present disclosure is not limited to the second exemplary embodiment, but step (b15) may not be included.

{Step (b11)}

Figure 9A:
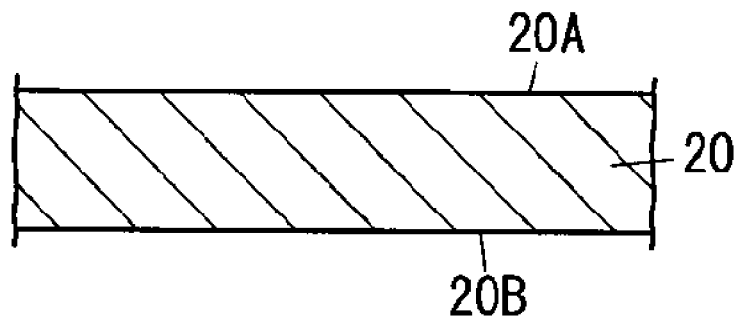
FIG. 9A is a schematic explanatory view illustrating a method for producing the laminate for see-through electrode of the second exemplary embodiment.

In step (b11), as illustrated in FIG. 9A, second support 20 including first main surface 20A and second main surface 20B is prepared. Second support 20 functions as a reinforcement (carrier) that backs up thin third metal layer 240 until third metal layer 240 adheres to first transparent base 110.

Kurtosis (Rku) of first main surface 20A of second support 20 ranges from 1.00 to 3.10, preferably ranges from 2.00 to 3.05, more preferably ranges from 2.00 to 3.00. When kurtosis (Rku) of first main surface 20A of second support 20 falls within the above range, as described later, kurtosis (Rku) of first main surface 240A of third metal layer 240 can be set in the range of 1.00 to 3.10.

Cellulose derivatives such as polyethylene terephthalate, 1, 4-polycyclohexylenedimethylene terephthalate, polyethylenenaphthalate, polyphenylene sulfide, polystyrene, polypropylene, polysulfone, aramid, polycarbonate, polyvinyl alcohol, cellophane, and cellulose acetate and resins such as polyethylene, polyvinyl chloride, nylon, polyimide, and ionomer can be used as the material constituting second support 20. The thickness of second support 20 is not particularly limited as long as second support 20 functions as the carrier.

For example, a method for performing hardening treatment on the surface of the sheet-shaped object made of the material constituting second support 20 and preparing second support 20 can be cited as the method for preparing second support 20.

For example, a method for thinly applying an acrylic hard coat material by gravure coating and performing curing with an infrared ray can be cited as the method for performing the hardening treatment on the sheet-shaped object.

{Step (b12)}

Figure 9B:
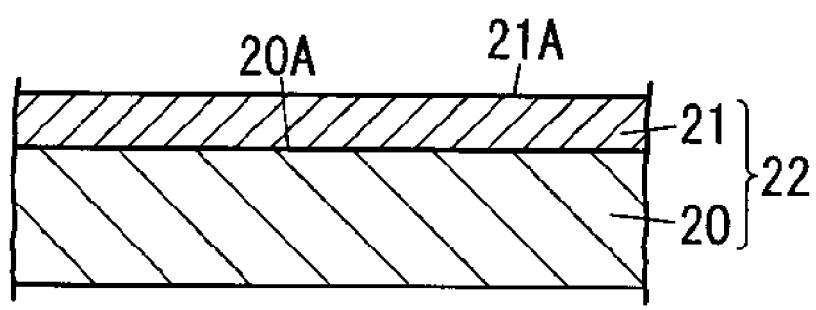
FIG. 9B is a schematic explanatory view illustrating the method for producing the laminate for see-through electrode of the second exemplary embodiment.

In step (b12), as illustrated in FIG. 9B, third heat-resistant layer 21 is formed on first main surface 20A. Consequently, fourth laminate 22 is obtained.

The same material as that illustrated as the material constituting heat-resistant layers 230, 260 can be used as the material constituting third heat-resistant layer 21. For example, a method for applying a coating liquid for heat-resistant layer on first main surface 20A and drying the coating liquid for heat-resistant layer can be cited as the method for forming third heat-resistant layer 21. For example, a gravure printing method, a screen printing method, and a reverse roll coating method in which a photogravure cylinder is used can be cited as the application method.

The surface quality of surface 21A of third heat-resistant layer 21 (hereinafter, referred to as first main surface 21A) on the side on which second peeling layer 23 is formed follows the surface quality of first main surface 20A of second support 20. That is, kurtosis (Rku) of first main surface 21A of third heat-resistant layer 21 can be estimated to be identical to kurtosis (Rku) of first main surface 20A of second support 20. Preferably an application amount of third heat-resistant layer 21 ranges, in thickness under dry condition, from 0.001 μm to 3 μm, more preferably ranges from 0.001 μm to 0.5 μm.

{Step (b13)}

Figure 9C:
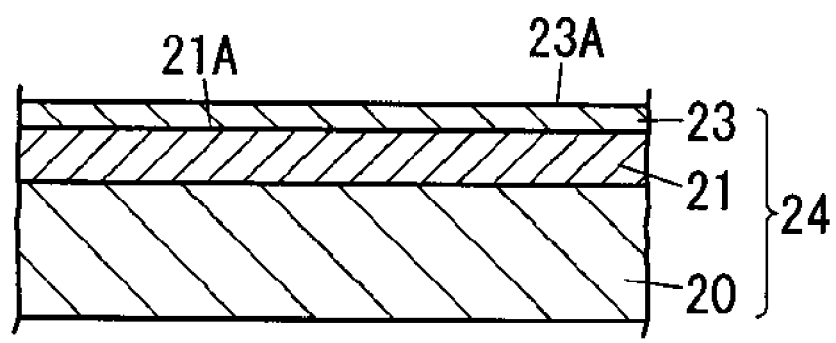
FIG. 9C is a schematic explanatory view illustrating the method for producing the laminate for see-through electrode of the second exemplary embodiment.

In step (b13), as illustrated in FIG. 9C, second peeling layer 23 is formed on third heat-resistant layer 21. Consequently, fifth laminate 24 is obtained.

Resins such as an acrylic resin, a polyester resin, a cellulose derivative resin, a polyvinyl acetal resin, a polyvinyl butyral resin, a vinyl chloride-vinyl acetate copolymer, chlorinated polyolefin, and a copolymer of a resin group thereof can be used as the material constituting second peeling layer 23. For example, a method for applying a peeling layer coating liquid containing the above resin on third heat-resistant layer 21 and drying the peeling layer coating liquid can be cited as the method for forming second peeling layer 23 For example, a gravure printing method, a screen printing method, and a reverse roll coating method in which a photogravure cylinder is used can be cited as the application method.

The surface quality of surface 23A of second peeling layer 23 (hereinafter, referred to as first main surface 23A) on the side on which third metal layer 240 is formed follows the surface quality of first main surface 21A of third heat-resistant layer 21. That is, kurtosis (Rku) of first main surface 23A of second peeling layer 23 can be estimated to be identical to kurtosis (Rku) of first main surface 21A of third heat-resistant layer 21. Preferably the application amount of second peeling layer 23 ranges, in thickness under dry condition, from 0.00001 µm to 0.005 µm, more preferably ranges from 0.00005 µm to 0.003 µm.

{Step (b14)}

Figure 9D:
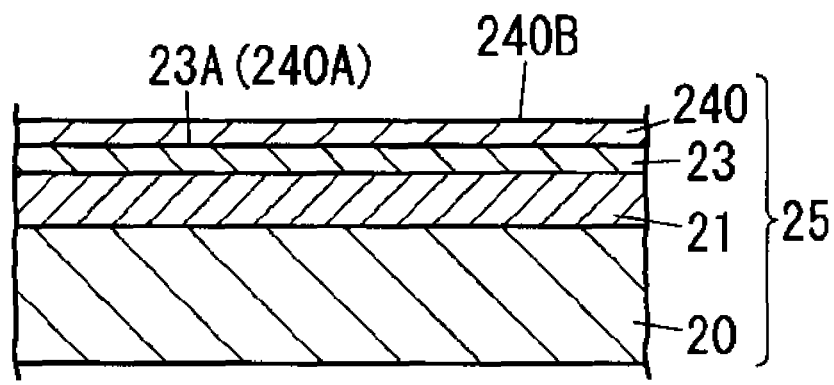
FIG. 9D is a schematic explanatory view illustrating the method for producing the laminate for see-through electrode of the second exemplary embodiment.
Figure 9E:
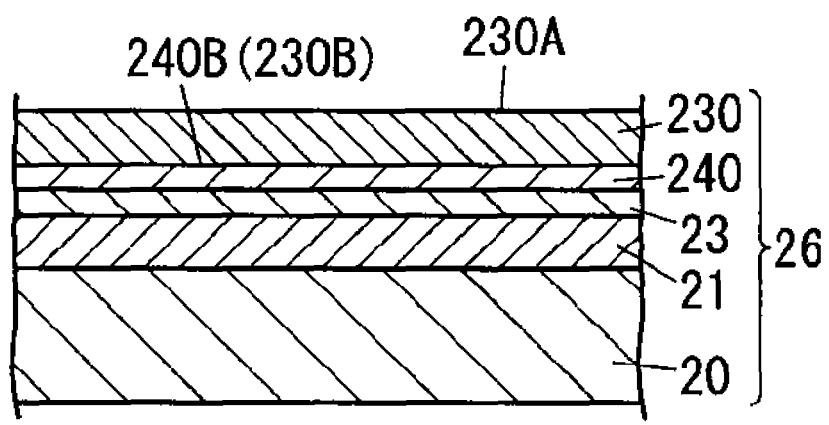
FIG. 9E is a schematic explanatory view illustrating the method for producing the laminate for see-through electrode of the second exemplary embodiment.

In step (b14), as illustrated in FIG. 9D, third metal layer 240 is formed on second peeling layer 23 by physical vapor deposition. Consequently, sixth laminate 25 is obtained. In this way, third metal layer 240 is directly formed on second peeling layer 23. For this reason, kurtosis (Rku) of first main surface 240A of third metal layer 240 and kurtosis (Rku) of first main surface 23A of second peeling layer 23 can be estimated to be identical to each other. In other words, kurtosis (Rku) of first main surface 240A of third metal layer 240 and kurtosis (Rku) of first main surface 20A of first support 20 can be estimated to be identical to each other. Examples of the physical vapor deposition include metal deposition, sputtering, and ion plating.

The surface quality of second main surface 240B of third metal layer 240 follows the surface quality of first main surface 23A of second peeling layer 23. Consequently, kurtosis (Rku) of second main surface 240B of third metal layer 240 falls within the above range.

{Step (b15)}

In step (b15), first heat-resistant layer 230 is formed on third metal layer 240. Consequently, metal layer with second support 26 in FIG. 9E is obtained.

For example, a method for applying the coating liquid for heat-resistant layer on second main surface 240B of third metal layer 240 and drying the coating liquid for heat-resistant layer can be cited as the method for forming first heat-resistant layer 230. For example, a gravure printing method, a screen printing method, and a reverse roll coating method in which a photogravure cylinder is used can be cited as the application method.

The surface quality of first main surface 230A of first heat-resistant layer 230 follows the surface quality of second main surface 240B of third metal layer 240. That is, kurtosis (Rku) of first main surface 230A of first heat-resistant layer 230 can be estimated to be identical to kurtosis (Rku) of second main surface 240B of third metal layer 240.

First heat-resistant layer 230 is directly formed on second main surface 240B of third metal layer 240. For this reason, kurtosis (Rku) of second main surface 230B of first heat-resistant layer 230 can be estimated to be identical to kurtosis (Rku) of second main surface 240B of third metal layer 240.

[Second Step (b2)]

Figure 9F:
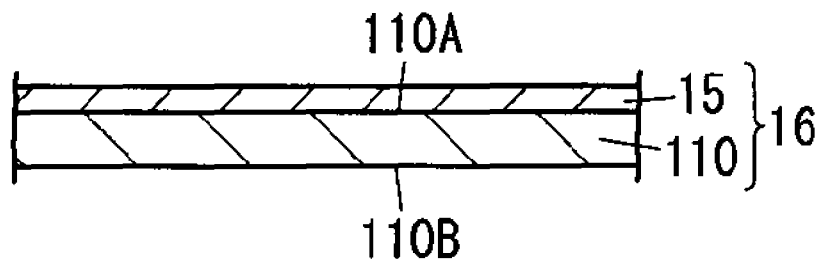
FIG. 9F is a schematic explanatory view illustrating the method for producing the laminate for see-through electrode of the second exemplary embodiment.

In second step (b2), as illustrated in FIG. 9F, similarly to the first exemplary embodiment, first transparent base 110 is prepared, and first transparent adhesive layer 15 is formed on first main surface 110A of first transparent base 110. Consequently, transparent base with first transparent adhesive layer 16 is prepared.

[Third Step (b3)]

Third step (b3) includes step (b31) of bonding metal layer with second support 26 and transparent base with first transparent adhesive layer 16 together and step (b32) of peeling off second support 20, third heat-resistant layer 21, and second peeling layer 23 from third metal layer 240. Consequently, second single-side laminate for see-through electrode 28 is obtained.

{Step (b31)}

In step (b31), surface 26A of metal layer with second support 26 (hereinafter, referred to as first main surface 26A) on the side of third metal layer 240 and surface 16A of transparent base with first transparent adhesive layer 16 are bonded together. Consequently, seventh laminate 27 is obtained.

Figure 9G:
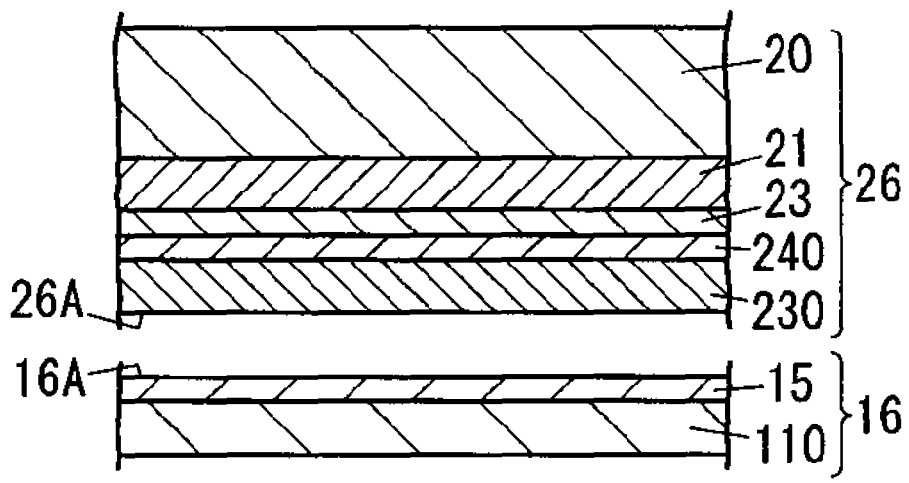
FIG. 9G is a schematic explanatory view illustrating the method for producing the laminate for see-through electrode of the second exemplary embodiment.

As to the bonding method, for example, as illustrated in FIG. 9G, first transparent adhesive layer 15 may be cured after first main surface 26A of metal layer with second support 26 and first main surface 16A of transparent base with first transparent adhesive layer 16 are opposed to each other. Consequently, first transparent adhesive layer 15 is cured, and first transparent adhesive layer 15 becomes first transparent adhesive layer 120.

{Step (b32)}

Figure 9H:
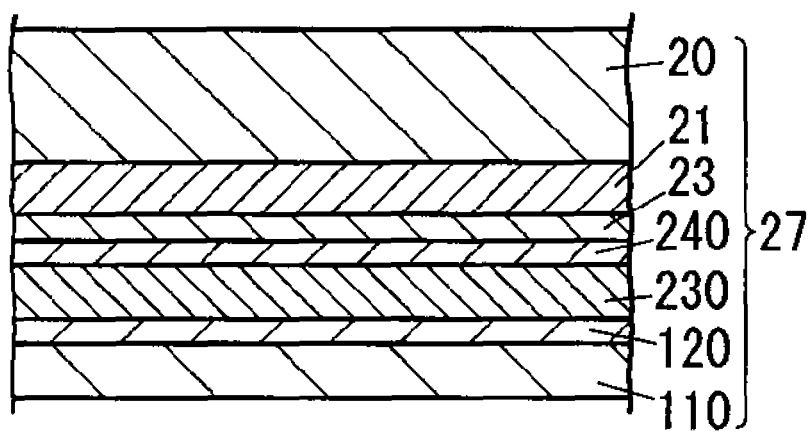
FIG. 9H is a schematic explanatory view illustrating the method for producing the laminate for see-through electrode of the second exemplary embodiment.
Figure 9I:
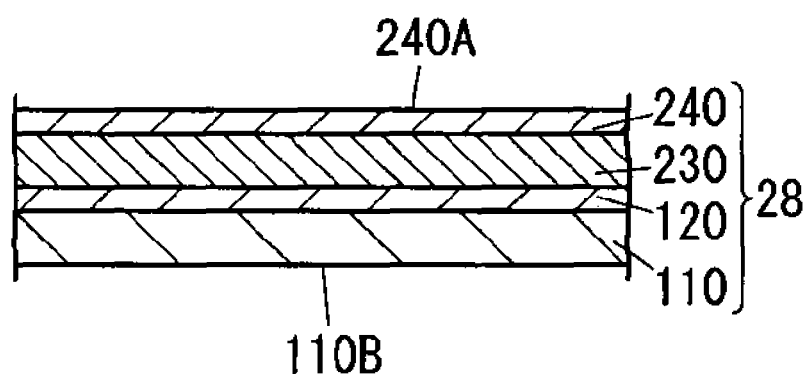
FIG. 9I is a schematic explanatory view illustrating the method for producing the laminate for see-through electrode of the second exemplary embodiment.

In step (b32), as illustrated in FIG. 9H, second support 20, third heat-resistant layer 21, and second peeling layer 23 are peeled off from third metal layer 240 in seventh laminate 27 in which metal layer with second support 26 and transparent base with first transparent adhesive layer 16 are bonded together. At this point, when second support 20 is peeled off, third heat-resistant layer 21 and second peeling layer 23 are peeled off from third metal layer 240 together with second support 20. Consequently, second single-side laminate for see-through electrode 28 in FIG. 9I is obtained.

[Laminate for See-Through Electrode 300 of Third Exemplary Embodiment]

Figure 10:
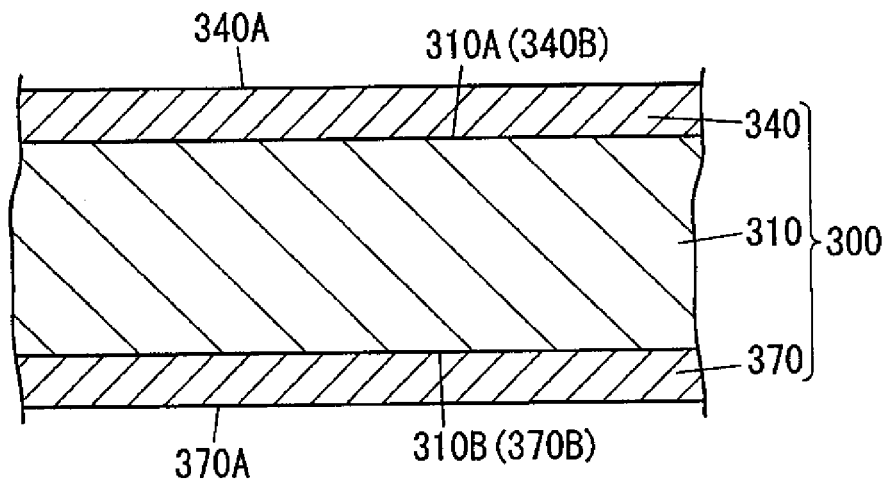
FIG. 10 is a sectional view in a thickness direction of a laminate for see-through electrode according to a third exemplary embodiment.
Figure 11:
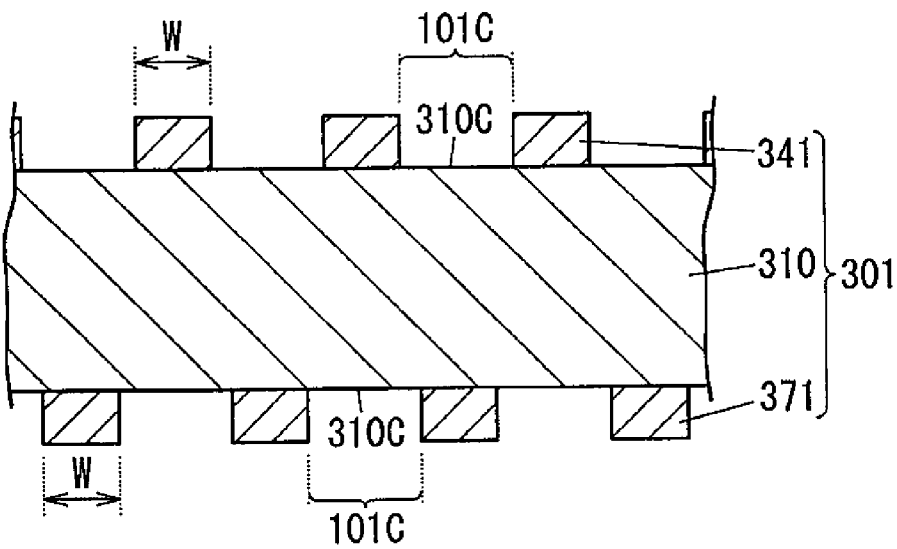
FIG. 11 is a sectional view in a thickness direction of a material for see-through electrode of the third exemplary embodiment.

FIG. 10 is a sectional view in a thickness direction of laminate for see-through electrode 300 of the third exemplary embodiment (hereinafter, sometimes referred to as third laminate for see-through electrode 300). FIG. 11 is a sectional view in a thickness direction of see-through electrode material 301 of the third exemplary embodiment (hereinafter, sometimes referred to as third see-through electrode material 301) In FIG. 11, the same component as that of third laminate for see-through electrode 300 in FIG. 10 is denoted by the same reference mark. In FIG. 10, the reference mark 300 denotes the third laminate for see-through electrode, the reference mark 310 denotes a second transparent base, the reference mark 340 denotes a fifth metal layer, and the reference mark 370 denotes a sixth metal layer. In FIG. 11, the reference mark 341 denotes a fifth circuit pattern layer, the reference mark 371 denotes a sixth circuit pattern layer.

As illustrated in FIG. 10, third laminate for see-through electrode 300 includes second transparent base 310, fifth metal layer 340, and sixth metal layer 370. Second transparent base 310 includes first main surface 310A and second main surface 310B. Fifth metal layer 340 is provided on first main surface 310A of second transparent base 310. That is, fifth metal layer 340 is directly formed on first main surface 310A of second transparent base 310. Sixth metal layer 370 is provided second main surface 310B of second transparent base 310. That is, sixth metal layer 370 is directly formed on second main surface 310B of second transparent base 310. Hereinafter, sometimes first main surface 310A and second main surface 310B are simply referred to as main surfaces 310A, 310B. Fifth metal layer 340 and sixth metal layer 370 are also referred to as metal layers 340, 370. Fifth circuit pattern layer 341 and sixth circuit pattern layer 371 are also referred to as circuit pattern layers 341, 371.

In the third exemplary embodiment, kurtosis (Rku) of surface 340A of fifth metal layer 340 (hereinafter, sometimes referred to as first main surface 340A) on the opposite side to the side facing second transparent base 310 ranges from 1.00 to 3.10, preferably ranges from 2.00 to 3.05, more preferably ranges from 2.00 to 3.00. Kurtosis (Rku) of main surface 370A of sixth metal layer 370 (hereinafter, sometimes referred to as first main surface 370A) on the opposite side to the side facing second transparent base 310 ranges from 1.00 to 3.10, preferably ranges from 2.00 to 3.05, more preferably ranges from 2.00 to 3.00. When kurtosis (Rku) of first main surface 340A of fifth metal layer 340 and kurtosis (Rku) of first main surface 370A of sixth metal layer 370 fall within the above range, circuit pattern layers 341, 371 are hardly disconnected even if third see-through electrode material 301 is bent.

[Second Transparent Base 310]

Second transparent base 310 is a sheet-shaped object including first main surface 310A and second main surface 310B. The same material as that illustrated as first transparent base 110 can be used as the material constituting second transparent base 310. The thickness of second transparent base 310 may appropriately be selected according to the use of third laminate for see-through electrode 300, and preferably the thickness ranges from 24 µm to 300 µm, more preferably ranges from 35 µm to 260 µm. When the thickness of second transparent base 310 falls within the above range, wrinkle is hardly generated, it is easy to handle, and transparency is excellent.

Preferably kurtosis (Rku) of first main surface 310A of second transparent base 310 ranges from 1.00 to 3.10, more preferably ranges from 2.00 to 3.05, further preferably ranges from 2.00 to 3.00. Kurtosis (Rku) of second main surface 310B of second transparent base 310 ranges from 1.00 to 3.10, preferably ranges from 2.00 to 3.05, more preferably ranges from 2.00 to 3.00. When kurtoses (Rku) of main surfaces 310A, 310B of second transparent base 310 fall within the above range, kurtosis (Rku) of first main surface 340A of fifth metal layer 340 and kurtosis (Rku) of first main surface 370A of sixth metal layer 370 can easily be set in the above range. In third see-through electrode material 301, kurtosis (Rku) of third outer surface 310C corresponding to opening 101C of second transparent base 310 falls within the above range, so that third see-through electrode material 301 having the excellent see-through property can be obtained.

[Metal Layers 340, 370]

Metal layers 340, 370 are formed on main surfaces 310A, 310B of second transparent base 310. Fifth metal layer 340 and sixth metal layer 370 may have the same configuration or different configurations.

Fifth metal layer 340 includes first main surface 340A and second main surface 340B on the opposite side to first main surface 340A. Sixth metal layer 370 includes first main surface 370A and second main surface 370B on the opposite side to first main surface 370A.

Metal layers 340, 370 are formed by physical vapor deposition. For example, aluminum, zinc, copper, silver, gold, tin, nickel, chromium, cobalt, brass, an alloy thereof, ITO (Indium Tin Oxide), or stainless steel can be used as the material constituting metal layers 340, 370. Preferably metal layers 340, 370 contain at least one kind selected from a group consisting of copper, nickel, aluminum, and silver.

Preferably the thicknesses of metal layers 340, 370 range from 0.1 µm to 9.0 µm, more preferably range from 0.1 µm to 3.0 µm, further preferably range from 0.2 µm to 1.0 µm. When the thicknesses of metal layers 340, 370 fall within the above range, finely-patterned circuit pattern layers 341, 371 can be formed. Consequently, in third see-through electrode material 301, opening 101C can be enlarged, and the optical transparency of third see-through electrode material 301 can be improved.

Preferably kurtosis (Rku) of second main surface 340B ranges from 1.00 to 3.10, more preferably ranges from 2.00 to 3.05. Preferably kurtosis (Rku) of second main surface 370B ranges from 1.00 to 3.10, more preferably ranges from 2.00 to 3.05.

Preferably surface roughness (Rz) of first main surface 340A ranges from 0.01 µm to 2.00 µm, more preferably ranges from 0.10 µm to 1.50 µm. Preferably surface roughness (Rz) of first main surface 370A ranges from 0.01 µm to 2.00 µm, more preferably ranges from 0.10 µm to 1.50 µm. Third laminate for see-through electrode 300, in which the disconnection is hardly generated even if third laminate for see-through electrode 300 is bent after the circuit is formed, can be obtained when main surfaces 340A, 370A fall within the above range.

The reflection reducing layer may be formed on first main surface 340A and on first main surface 370A. That is, the blackening treatment may be subjected to first main surface 340A of fifth metal layer 340 and first main surface 370A of sixth metal layer 370. Consequently, third see-through electrode material 301 in which circuit pattern layers 341, 371 are hardly visually recognized can be obtained even if the metal having the high reflectance is used as the material constituting metal layers 340, 370. A material similar to the material illustrated as the material constituting reflection reducing layers 130, 160 can be used as the material constituting the reflection reducing layer.

[See-Through Electrode Material 301 of Third Exemplary Embodiment]

As illustrated in FIG. 11, third see-through electrode material 301 differs from third laminate for see-through electrode 300 in that parts of metal layers 340, 370 include circuit pattern layers 341, 371 including openings 101C. In FIG. 11, the same component as that of third laminate for see-through electrode 300 in FIG. 10 is denoted by the same reference mark, and the description will be omitted.

Circuit pattern layers 341, 371 are see-through electric circuits in which metal layers 340, 370 are partially removed by etching or the like to form gaps constituting openings 101C in metal layers 340, 370. The pattern shapes of circuit pattern layers 341, 371 may appropriately be adjusted according to the use of third see-through electrode material 301. For example, a mesh shape, a parallel thin line pattern shape, and a comb shape can be cited.

Preferably the sheet resistance of third see-through electrode material 301 ranges from 0.01 Ω/sq to 50 Ω/sq, more preferably ranges from 0.05 Ω/sq to 10 Ω/sq, further preferably ranges from 0.1 Ω/sq to 5 Ω/sq.

Preferably the total light transmittance of third see-through electrode material 301 is greater than or equal to 60%, more preferably is greater than or equal to 65%, further preferably is greater than or equal to 70%. When the total light transmittance of third see-through electrode material 301 falls within the above range, third see-through electrode material 301 can suitably be used as a touch panel sensor and the like. The total light transmittance is a value measured with a haze meter.

For example, third see-through electrode material 301 is suitably used in a touch panel sensor, an electromagnetic wave absorption sheet, a printed wiring board, and a see-through antenna.

[Method for Producing Laminate for See-Through Electrode 300 of Third Exemplary Embodiment]

A method for producing laminate for see-through electrode 300 of third exemplary embodiment (hereinafter, referred to as a method for producing third laminate for see-through electrode 300) includes a first step of preparing second transparent base 310 and a second step forming first metal layers 340, 370 on first main surface 310A and second main surface 310B by physical vapor deposition.

In the first step, second transparent base 310 including first main surface 310A and second main surface 310B is prepared, kurtosis (Rku) of first main surface 310A ranging from 1.00 to 3.10. In order to set kurtosis (Rku) of first main surface 310A of second transparent base 310 in the above range, a film prepared by a cast method in which a smooth die is used or a biaxially stretching method may be used, kurtosis (Rku) of the surface of the film ranging from 1.00 to 3.10.

In the second step, metal layers 340, 370 are formed on first main surface 310A and second main surface 310B by the physical vapor deposition. Consequently, third laminate for see-through electrode 300 is obtained.

The surface quality of first main surface 340A of fifth metal layer 340 follows the surface quality of first main surface 310A of second transparent base 310. Consequently, kurtosis (Rku) of first main surface 340A of fifth metal layer 340 falls within the range of 1.00 to 3.10. Fifth metal layer 340 is directly formed on first main surface 340A. For this reason, kurtosis (Rku) of second main surface 340B of fifth metal layer 340 can be estimated to be identical to kurtosis (Rku) of first main surface 310A of second transparent base 310. Similarly, the surface quality of first main surface 370A of sixth metal layer 370 follows the surface quality of second main surface 310B of second transparent base 310. Consequently, kurtosis (Rku) of first main surface 370A of sixth metal layer 370 falls within the range of 1.00 to 3.10. Sixth metal layer 370 is directly formed on second main surface 370B. For this reason, kurtosis (Rku) of second main surface 370B of sixth metal layer 370 can be estimated to be identical to kurtosis (Rku) of second main surface 310B of second transparent base 310.

Examples of the physical vapor deposition include metal deposition, sputtering, and ion plating.

In the second step of the third exemplary embodiment, metal layers 340, 370 are formed on first main surface 310A and second main surface 310B by the physical vapor deposition. However, the present disclosure is not limited to the third exemplary embodiment. Alternatively, in the second step, first metal layer 340 may be formed only on first main surface 310A by the physical vapor deposition.

EXAMPLES

Hereinafter, the present disclosure is more specifically described with reference to Examples.

In Examples, the methods for measuring surface roughness (Rz), kurtosis (Rku), and thickness of the metal layer are as follows.

(Measurement of Surface Roughness (Rz))

Using surface roughness measuring instrument "SURF-COM 1500SD" (product of TOKYO SEIMITU CO., LTD.), surface roughness (Rz) was measured by a needle touching method with a stylus of 2 µm in conforming to JIS B 0651 (1996) and JIS B 0601 (1994).

(Measurement of Kurtosis (Rku))

Using a laser microscope "VK-X 100" (product of KEYENCE CORPORATION) with a fiftyfold lens, the surface was measured by a measurement program in conforming to JIS B 0601:2001. Surface roughness: whole region mode measurement of JIS B 0601 (2001) was performed by an analysis program to obtain kurtosis (Rku).

(Measurement of Thickness of Metal Layer)

A weight of copper foil cut into 10 cm square was measured, and converted from density of 8.96 g/cm$^3$ of copper, thereby calculating the thickness of the metal layer.

Example 1

[Preparation of Metal Layer 14 with First Support]

Electrolytic copper foil having the thickness of 18 µm was prepared as first support 10 in FIG. 4A. In the surface quality of first main surface 10A of first support 10, surface roughness (Rz) was 0.98 µm, and kurtosis (Rku) was 2.70. In the surface quality of second main surface 10B of first support 10, surface roughness (Rz) was 0.98 µm, and kurtosis (Rku) was 3.51.

The surface of first support 10 was cleaned in 10%-sulfuric acid by cathodic treatment on the condition of temperature of 30° C., current density of 5 A/dm$^2$, and step time of 20 seconds, and washed for 20 seconds using pure water.

Subsequently, the electrolysis was performed in a peeling layer forming electrolytic solution prepared with the following composition on the following condition. Consequently, first peeling layer 11 was formed on first main surface 10A to obtain first laminate 12 in FIG. 4B. Subsequently, first laminate 12 was washed for 20 seconds by running water.

(Composition of Peeling Layer Forming Electrolytic Solution)
  nickel sulfate hexahydrate: 30 g/l
  $Na_2MoO_4$ dihydrate: 3 g/l
  sodium citrate: 40 g/l
(electrolysis condition in forming first peeling layer 11)
  temperature: 30° C.
  pH: 6
  current density: 2 A/dm$^2$
  step time: 20 seconds Subsequently, first laminate 12 was immersed in a copper pyrophosphate plating bath prepared with the following composition to perform the cathodic treatment on the following condition, and first laminate 12 was washed for 20 seconds by pure water.

(Composition of Copper Pyrophosphate Plating Bath)
  copper pyrophosphate: 80 g/l
  potassium pyrophosphate: 320 g/l
  ammonia water: 2 ml/l
(Condition of Cathodic Treatment)
  temperature: 40° C.
  pH: 8.5
  current density: 2.0 A/dm$^2$
  step time: 20 seconds Subsequently, first laminate 12 was immersed in an extremely thin copper foil layer forming electrolytic solution prepared with the following composition to perform the electrolysis on the following condition. Consequently, the extremely thin copper foil layer having the thickness of 2 µm was formed as first metal layer 140 on first peeling layer 11 to obtain second laminate 13 in FIG. 4C.

(Composition of Extremely Thin Copper Foil Layer Forming Electrolytic Solution)
  copper sulfate pentahydrate: 150 g/l
  sulfuric acid: 100 g/l
  3-mercapto-1-propanesulfonic acid sodium salt (MPS): 5 ppm
  polyethylene glycol (weight-average molecular weight of 2000): 15 ppm
  chlorine ion: 10 ppm (Electrolysis Condition in Forming Extremely Thin Copper Foil Layer (First Metal Layer 140))
    temperature: 40° C.
    pH: 7
    current density: 7 A/dm$^2$
    step time: 60 seconds After second laminate 13 was washed for 20 seconds by running water, the rustproofing treatment and the silane coupling agent treatment were performed on the following condition.

(Composition of Step Solution Used in Rustproofing Treatment)
    methylbenzotriazole: 8 g/l (Rustproofing Treatment Condition)
    step temperature: 30° C.
    step (immersion) time: 10 seconds
    drying temperature: 120° C.
    drying time: 10 seconds (Composition of Silane Coupling Agent Used in Silane Coupling Treatment)
    3-aminopropyltrimethoxysilane water solution (water solution concentration: 5 g/l)

(Silane Coupling Treatment Condition)
    step temperature: 25° C.
    step time: 3-second showering
    drying temperature: 120° C.
    drying time: 10 seconds Subsequently, second laminate 13 was immersed in a nickel citrate plating bath prepared with the following composition to perform the electrolysis on the following condition. Consequently, a thin Ni layer was formed as first reflection reducing layer 130 on second surface 140B of first metal layer 140, and metal layer with first support 14 in FIG. 4D was obtained.

(Composition of Nickel Citrate Plating Bath)
    nickel sulfate: 280 g/l
    nickel chloride: 45 g/l
    citric acid: 21 g/l (Electrolysis Condition in Forming First Reflection Reducing Layer 130)
    temperature: 50° C.
    pH:5
    current density: 3.0 A/dm$^2$
    step time: 5 seconds In the surface quality of first main surface 130A of first reflection reducing layer 130, surface roughness (Rz) was 0.94 μm, and kurtosis (Rku) was 2.75.

[Preparation of Transparent Base with First Transparent Adhesive Layer 16]

A high-transparency PET film COSMOSHINE A4300 (product of TOYOBO CO., LTD.) having the thickness of 100 μm was prepared as first transparent base 110. A transparent adhesive (urethane resin) prepared with the following composition was applied onto first main surface 110A of first transparent base 110 with an application amount of 3 g/m$^2$, and dries by holding the transparent adhesive for 5 minutes under an environment of 100° C. Consequently, first transparent adhesive layer 15 having the thickness of 7 μm was formed, and transparent base with first transparent adhesive layer 16 in FIG. 4E was prepared.

(Composition of Transparent Adhesive)
    main agent: "DINAREO VA-3020" (product of TOYO INK CO., LTD.)
    hardener: "DINAREO HD-701" (product of TOYO INK CO., LTD.)
    mass ratio: main agent/hardener=100/7

[Preparation of First Single-Side Laminate for See-Through Electrode 18]

Subsequently, transparent adhesive layer 15 of transparent base with first transparent adhesive layer 16 and first reflection reducing layer 130 of metal layer with first support 14 were opposed to each other as illustrated in FIG. 4F, and transparent base with first transparent adhesive layer 16 and metal layer with first support 14 were bonded together while overlapping each other. The bonded state was held for 5 days in an environment of 60° C., and third laminate 17 in FIG. 4G was obtained. Subsequently, first support 10 and first peeling layer 11 were peeled off from third laminate 17 to obtain first single-side laminate for see-through electrode 18 in FIG. 4H. At this point, when first support 10 was peeled off, first peeling layer 11 was peeled off from first metal layer 140 together with first support 10.

In the surface quality of first main surface 140A of first metal layer 140, surface roughness (Rz) was 0.98 μm, and kurtosis (Rku) was 2.73.

[Preparation of Single-Side See-Through Electrode Material 30]

Figure 12A:
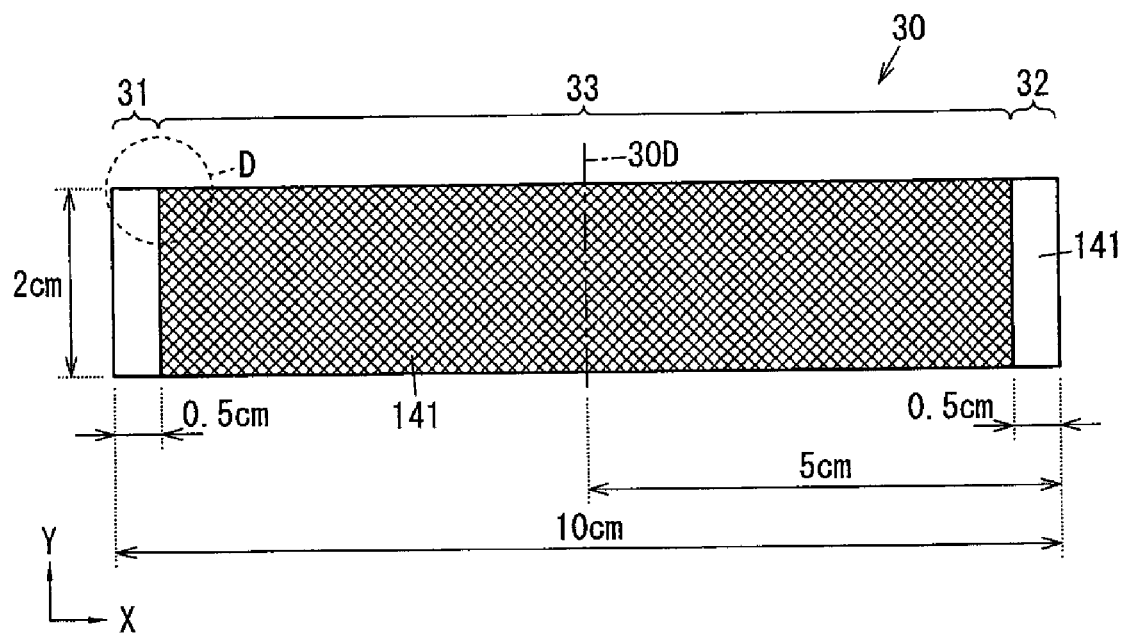
FIG. 12A is a front view of a single-side material for see-through electrode obtained by circuit formation of a first metal layer of a single-side laminate for see-through electrode obtained in Example 1.
Figure 12B:
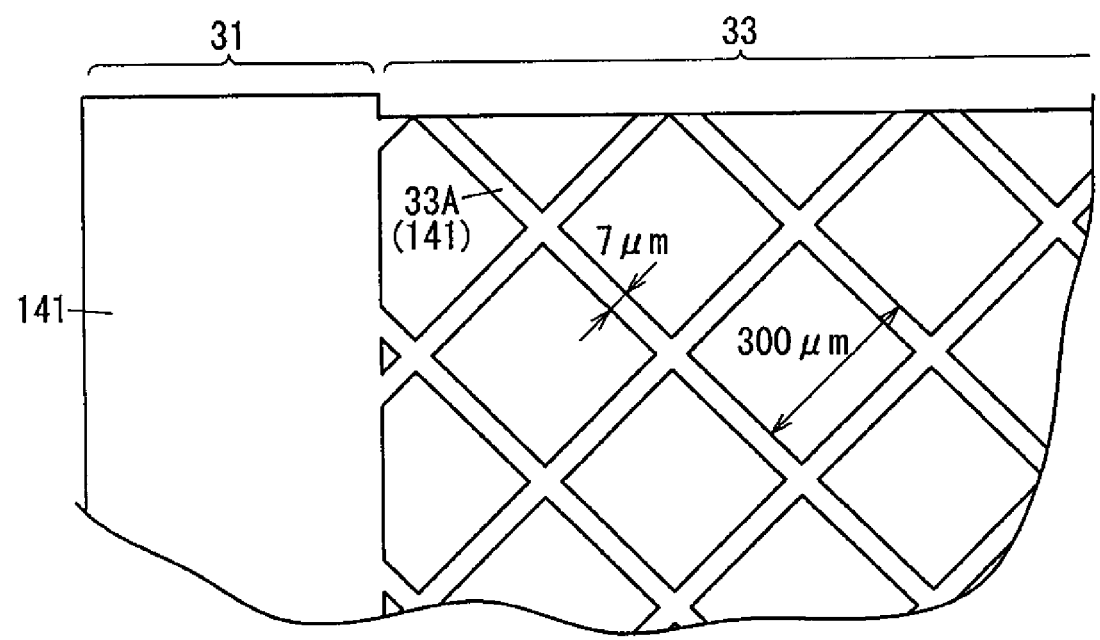
FIG. 12B is an enlarged front view of a D portion in FIG. 12A.

FIG. 12A is a front view of the single-side see-through electrode material obtained by circuit formation of the first metal layer of single-side laminate for see-through electrode 18 obtained in Example 1. FIG. 12B is an enlarged front view of a D portion in FIG. 12A. In FIGS. 12A and 12B, the reference mark 30 denotes the single-side see-through electrode material, the reference mark 31 denotes a solid-shaped first circuit pattern, the reference mark 32 denotes a solid-shaped second circuit pattern, the reference mark 33 denotes a mesh-shaped third circuit pattern, and the reference mark 30D denotes a center line in the X-direction of the single-side see-through electrode material.

First metal layer 140 of first single-side laminate for see-through electrode 18 was etched to obtain single-side see-through electrode material 30 in FIGS. 12A and 12B.

Single-side see-through electrode material 30 includes solid-shaped first circuit pattern 31 (hereinafter, referred to as first solid unit 31) extending along a Y-direction, solid-shaped second circuit pattern 32 (hereinafter, referred to as second solid unit 32) extending along the Y-direction, and mesh-shaped third circuit pattern 33 (hereinafter, referred to as third pattern 33).

First solid unit 31 is formed at one end in the X-direction of single-side see-through electrode material 30, and second solid unit 32 is formed at the other end in the X-direction of single-side see-through electrode material 30. Third pattern 33 is formed between first solid unit 31 and second solid unit 32 in the X-direction.

As illustrated in FIG. 12A, in single-side see-through electrode material 30, a length in the X-direction was 10 cm, and a length in the Y-direction was 2 cm. As illustrated in FIG. 12A, in first solid unit 31 and second solid unit 32 (hereinafter, sometimes referred to as solid units 31, 32), the length in the X-direction was 0.5 cm, and the length in the Y-direction was 2 cm. As illustrated in FIG. 12B, in third pattern 33, thin line 33A had a line width of 7 μm, and a pitch between adjacent thin lines 33A, 33A was 300 Gm.

[Disconnection Resistance Test]

Figure 13A:
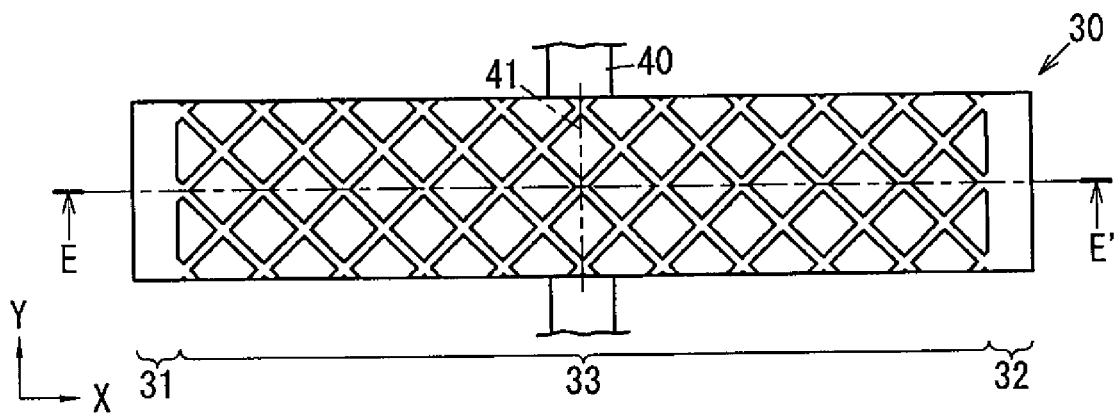
FIG. 13A is a front view illustrating a state in which the material for see-through electrode is placed on a metal rod.
Figure 13B:
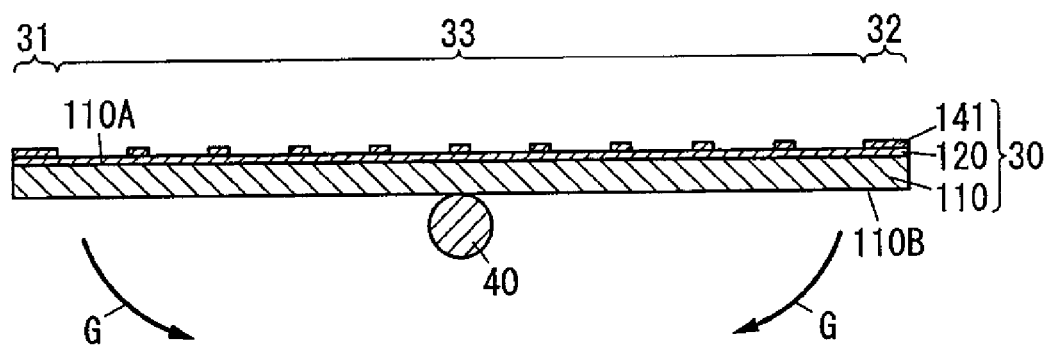
FIG. 13B is a schematic sectional view of the material for see-through electrode and the metal rod taken along line E-E' in FIG. 13A.
Figure 13C:
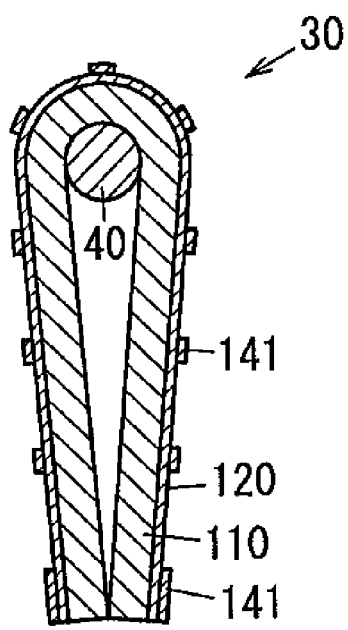
FIG. 13C is a schematic sectional view illustrating the material for see-through electrode to which a load is applied for the purpose of explanation of a disconnection resistance test.

FIG. 13A is a front view illustrating a state in which see-through electrode material 30 is placed on metal rod 40. FIG. 13B is a schematic sectional view of see-through electrode material 30 and metal rod 40 taken along line E-E' in FIG. 13A. FIG. 13C is a schematic sectional view illustrating see-through electrode material 30 to which a load is applied for the purpose of explanation of a disconnection resistance test. In FIG. 13A to 13C, the reference mark 40 denotes the metal rod and the reference mark 41 denotes a line contact portion between see-through electrode material 30 and metal rod 40.

One of tester rods of a tester was brought into contact with first solid unit 31, the other tester rod was brought into contact with second solid unit 32, and conduction of third pattern 33 was checked.

Subsequently, as illustrated in FIG. 13A, single-side see-through electrode material 30 was placed on metal rod 40 having a diameter of 1 mm such that first circuit pattern layer 141 was directed upward, namely, such that first main surface 110A of first transparent base 110 was directed upward. Subsequently, single-side see-through electrode material 30 was disposed such that line contact portion 41 between metal rod 40 and see-through electrode material 30 and center line 30D in the X-direction of single-side see-through electrode material 30 in FIGS. 12A and 12B overlapped each other.

Subsequently, bending treatment was performed for 400 cycles. In one cycle of the bending treatment, a load was applied to both ends in the X-direction of single-side see-through electrode material 30 in direction G of FIG. 13B, single-side see-through electrode material 30 was bent with metal rod 40 as a supporting point as illustrated in FIG. 13C, and the load was released to return to an original state after both ends of single-side see-through electrode material 30 were brought into contact with each other.

Subsequently, one of the tester rods of the tester was brought into contact with first solid unit 31 of single-side see-through electrode material 30 on which the 400-cycle bending treatment was performed, and the other tester rod was brought into contact with second solid unit 32, and the conduction was measured. The measurement value was less than 1Ω. From this result, the conduction of third pattern 33 was able to be confirmed, and it is found that third pattern 33 was not disconnected. That is, kurtosis (Rku) of first main surface 140A of first metal layer 140 ranged from 1.00 to 3.10, so that it was confirmed that the disconnection was hardly generated even if single-side see-through electrode material 30 was bent after the circuit was formed.

Third pattern 33 was determined to be conductive in the case that the measurement value of the conduction was less than 1Ω, and third pattern 33 was determined to be disconnected in the case that the measurement value of the conduction was larger than 1Ω.

Example 2

[Preparation of First Laminate for See-Through Electrode 100]

Second transparent adhesive layer 150, second reflection reducing layer 160, and second metal layer 170 were formed in this order on second main surface 110B of first transparent base 110 of first single-side laminate for see-through electrode 18 obtained in Example 1 by the method similar to that of Example 1, and first laminate for see-through electrode 100 in FIG. 1A was obtained. In obtained first laminate for see-through electrode 100, each of transparent adhesive layers 120, 150, reflection reducing layers 130, 160, and metal layers 140, 170 has the same configuration.

In the surface quality of first main surface 170A of second metal layer 170, surface roughness (Rz) was 0.98 μm, and kurtosis (Rku) was 2.70.

[Preparation of Both-Side See-Through Electrode Material 2]

Metal layers 140, 170 of first laminate for see-through electrode 100 were etched by the method similar to that of Example 1 to obtain first see-through electrode material 101 in which circuit patterns in FIGS. 12A and 12B were formed on both surfaces.

[Disconnection Resistance Test]

When the disconnection resistance test was performed similarly to Example 1, the measurement value was less than 1Ω. From this result, it was found that third pattern 33 formed on the side of first main surface 110A of first transparent base 110 was not disconnected.

Aside from this, the disconnection resistance test was performed similarly to the disconnection resistance test described in Example 1 except that first see-through electrode material 101 was placed on metal rod 40 such that second main surface 110B of first transparent base 110 was oriented upward. The measurement value was less than 1Ω. From this result, it was found that third pattern 33 formed on the side of second main surface 110B of first transparent base 110 was not disconnected.

That is, kurtosis (Rku) of first main surface 140A of first metal layer 140 and kurtosis (Rku) of first main surface 170A of second metal layer 170 ranged from 1.00 to 3.10, so that it was confirmed that the disconnection was hardly generated even if both-side see-through electrode material 2 was bent after the circuits were formed.

Example 3

[Preparation of Metal Layer with Second Support 26]

As illustrated in FIG. 9A, the high-transparency PET film COSMOSHINE A4300 (product of TOYOBO CO., LTD.) having the thickness of 50 μm was prepared as second support 20. In the surface quality of first main surface 20A of second support 20, surface roughness (Rz) was 0.89 μm, and kurtosis (Rku) was 2.66.

Subsequently, the coating liquid for heat-resistant layer prepared with the following composition was applied onto first main surface 20A of second support 20 using a gravure coater, and dried such that the application amount became 1.0 g/m² in a dryness state. Consequently, third heat-resistant layer 21 was formed on first main surface 20A to obtain fourth laminate 22 in FIG. 9B.

<Composition of Coating Liquid for Heat-Resistant Layer>
  acrylic resin (acrylic resin/methyl methacrylate=97/3) 1.25 parts by mass
  tolylene diisocyanate 1.875 parts by mass
  methyl ethyl ketone 0.2 parts by mass
  toluene 1.8 parts by mass Subsequently, the coating liquid for peeling layer prepared with the following composition was applied onto third heat-resistant layer 21 of fourth laminate 22 using the gravure coater, and dried such that the application amount became 0.4 g/m² in terms of a solid content. Consequently, second peeling layer 23 was formed on third heat-resistant layer 21 to obtain fifth laminate 24 in FIG. 9C.

<Composition of Coating Liquid for Peeling Layer>
  acrylic resin (Dianal BR83 (product of MITSUBISHI CHEMICAL) 13.50 parts by mass
  vinyl chloride-vinyl acetate copolymer resin 1.50 parts by mass (SOLBIN C (product of Nissin Chemical co., ltd.))
  polyester resin (VYLON 200 (product of TOYOBO CO., LTD.) 0.09 parts by mass
  amorphous silica 3.00 parts by mass
  methyl ethyl ketone 70.09 parts by mass
  toluene 18.12 parts by mass Subsequently, aluminum was evaporated on second peeling layer 23 of fifth laminate 24 by a vacuum evaporation method, and third metal layer 240 having the thickness of 5000 Å was formed. Consequently, sixth laminate 25 in FIG. 9D was obtained.

The coating liquid for heat-resistant layer was applied onto second main surface 240B of third metal layer 240 of sixth laminate 25 using the gravure coater, and dried such that the application amount became 1.0 g/m² in the dryness state. Consequently, first heat-resistant layer 230 was formed on third metal layer 240, and metal layer with second support 26 in FIG. 9E was obtained.

A layer configuration of metal layer with second support 26 was first heat-resistant layer 230/third metal layer 240/second peeling layer 23/third heat-resistant layer 21/second support 20 as illustrated in FIG. 9E.

[Preparation of Transparent Base with First Transparent Adhesive Layer 16]

Transparent base with transparent adhesive layer 16 in FIG. 9F was obtained similarly to Example 1.

[Preparation of Second Single-Side Laminate for See-Through Electrode 28]

Subsequently, transparent adhesive layer 15 of transparent base with first transparent adhesive layer 16 and first heat-resistant layer 230 of metal layer with second support 26 were opposed to each other as illustrated in FIG. 9G, and transparent base with first transparent adhesive layer 16 and metal layer with second support 26 were bonded together while overlapping each other. The bonded state was held for 5 days in an environment of 60° C., and seventh laminate 27 in FIG. 9H was obtained.

Subsequently, second support 20 was peeled off from seventh laminate 27 to obtain second single-side laminate for see-through electrode 28. In peeling off second support 20, third heat-resistant layer 21 and second peeling layer 23 were peeled off together with second support 20.

In the surface quality of first main surface 240A of third metal layer 240, surface roughness (Rz) was 0.89 μm, and kurtosis (Rku) was 2.66.

[Preparation of Single-Side See-Through Electrode Material]

Third metal layer 240 of second single-side laminate for see-through electrode 28 was etched to obtain the single-side see-through electrode material in which the circuit pattern in FIGS. 12A and 12B was formed on the single-side surface.

[Disconnection Resistance Test]

When the disconnection resistance test was performed similarly to Example 1 except that the bending treatment was performed 300 times, the measurement value was less than 1Ω. From this result, it was found that the third pattern formed on the side of first main surface 110A of first transparent base 110 was not disconnected. That is, kurtosis (Rku) of first main surface 240A of third metal layer 240 ranged from 1.00 to 3.10, so that it was confirmed that the disconnection was hardly generated even if the single-side see-through electrode material was bent after the circuit was formed.

Comparative Example 1

[Preparation of See-Through Electrode Material]

The laminate for see-through electrode was obtained similarly to Example 1 except that first metal layer 140 was formed only on the side of second main surface 10B of first support 10, and then the see-through electrode material was obtained.

In the surface quality of second main surface 10B of first support 10, surface roughness (Rz) was 0.98 μm, and kurtosis (Rku) was 3.51. In the surface quality of first main surface 130A of first reflection reducing layer 130 in the laminate for see-through electrode, surface roughness (Rz) was 0.98 μm, and kurtosis (Rku) was 3.51. In the surface quality of first main surface 140A of first metal layer 140, surface roughness (Rz) was 0.97 μm, and kurtosis (Rku) was 3.53.

[Disconnection Resistant Test]

When the disconnection resistance test was performed similarly to Example 1 except that the bending treatment was performed 205 times, the measurement value was greater than 1Ω. From this result, the conduction of the third pattern was able to be confirmed, and it is found that the third pattern was not disconnected. That is, kurtosis (Rku) of first main surface 140A of first metal layer 140 ranged from 1.00 to 3.10 which was out of the range, so that it was confirmed that the disconnection was generated when the see-through electrode material was bent after the circuit was formed.

The laminate for see-through electrode and the see-through electrode material of the present disclosure can be used in electronic devices such as a fine-pattern touch panel sensor.

The invention claimed is:

1. A laminate for a see-through electrode, the laminate comprising:
    a transparent base; and
    a metal layer that is provided on at least one of both surfaces of the transparent base, wherein:
    the metal layer has a first surface and a second surface, the first surface facing the transparent base, the second surface being at a side opposite to the first surface, and the second surface has a kurtosis (Rku) ranging from 1.00 to 3.10, inclusive, and a surface roughness (Rz) ranging from 0.89 μm to 2.0 μm, inclusive.

2. The laminate according to claim 1, further comprising a transparent adhesive layer between the transparent base and the metal layer.

3. The laminate according to claim 2, wherein the transparent adhesive layer contains at least one of an acrylic resin, an epoxy resin, a urethane resin, and a mixed resin of an acrylic resin, an epoxy resin, and a urethane resin.

4. The laminate according to claim 2, wherein hardness of the transparent adhesive layer ranges from 1.0 N/mm² to 200 N/mm², inclusive.

5. The laminate according to claim 1, wherein the metal layer contains at least one kind selected from a group consisting of copper, nickel, aluminum, and silver.

6. The laminate according to claim 1, wherein the second surface of the metal layer is blackened.

7. A material for a see-through electrode, the material comprising the laminate according to claim 1, wherein the metal layer partly includes a circuit pattern having an opening.

8. A material including a laminate for a see-through electrode, the laminate comprising:
    a transparent base; and
    a metal layer that is provided on at least one of both surfaces of the transparent base, wherein:
    the metal layer has a first surface and a second surface, the first surface facing the transparent base, the second surface being at a side opposite to the first surface,
    the second surface has a kurtosis (Rku) ranging from 1.00 to 3.10, inclusive,
    the metal layer partly includes a circuit pattern having an opening, and
    sheet resistance of the material ranges from 0.01 Ω/sq to 50 Ω/sq, inclusive.

9. The material according to claim 7, wherein total light transmittance is greater than or equal to 60%.

10. A device comprising:
the material according to claim 7; and
a control circuit that is electrically connected to the circuit pattern layer.

11. A method of producing a laminate for a see-through electrode, the method comprising:
a first step of preparing a transparent base, the transparent base having a first main surface and a second main surface, the first main surface having a kurtosis (Rku) ranging from 1.00 to 3.10, inclusive, and a surface roughness (Rz) ranging from 0.89 μm to 2.0 μn, inclusive; and
a second step of forming a metal layer on the first main surface by physical vapor deposition.

12. The method according to claim 11, wherein the second main surface has a kurtosis (Rku) ranging from 1.00 to 3.10, inclusive.

13. A method of producing a laminate for a see-through electrode, the method comprising:
a first step of producing a metal layer with a support by preparing the support having a first main surface and a second main surface, the first main surface having a kurtosis (Rku) ranging from 1.00 to 3.10, inclusive, and a surface roughness (Rz) ranging from 0.89 μm to 2.0 μm, inclusive, forming a peeling layer on the first main surface, and then forming the metal layer on the peeling layer by electroplating;
a second step of producing a transparent base with a transparent adhesive layer by preparing the transparent base, and forming the transparent adhesive layer on at least one of both surfaces of the transparent base; and
a third step of bonding a surface of the metal layer with the support on which the metal layer is provided and a surface of the transparent base with the transparent adhesive layer on which the transparent adhesive layer is provided, and then peeling off the support and the peeling layer from the metal layer.

14. The method according to claim 13, wherein in the first step, blackening treatment is subjected to the metal layer formed on the peeling layer.

15. A method of producing a laminate for a see-through electrode, the method comprising:
a first step of producing a metal layer with a support by preparing the support having a first main surface and a second main surface, the first main surface having a kurtosis (Rku) ranging from 1.00 to 3.10, inclusive, forming a peeling layer on the first main surface, and then forming the metal layer on the peeling layer by electroplating;
a second step of producing a transparent base with a transparent adhesive layer by preparing the transparent base, and forming the transparent adhesive layer on at least one of both surfaces of the transparent base; and
a third step of bonding a surface of the metal layer with the support on which the metal layer is provided and a surface of the transparent base with the transparent adhesive layer on which the transparent adhesive layer is provided, and then peeling off the support and the peeling layer from the metal layer,
wherein the first step includes:
preparing an electrolytic metal foil by an electrolytic step in which an electrodeposition drum is used, the electrolytic metal foil including a first main surface in contact with the electrodeposition drum and a second main surface not in contact with the electrodeposition drum;
applying smoothing treatment to the first main surface of the electrolytic metal foil; and
producing the support from the electrolytic metal foil applied with the smoothing treatment.

16. The method according to claim 15, wherein in the applying the smoothing treatment, an electroplated coating is electrodeposited on the first main surface of the electrolytic metal foil by electroplating.

17. The method according to claim 15, wherein in the applying the smoothing treatment, the first main surface of the electrolytic metal foil is polished by electrochemical polishing.

18. The laminate for see-through electrode producing method according to claim 15, wherein in the applying the smoothing treatment, the first main surface of the electrolytic metal foil is polished by chemical polishing.

19. A method of producing a laminate for a see-through electrode, the method comprising:
a first step of producing a metal layer with a support by preparing the support having a first main surface and a second main surface, the first main surface having a kurtosis (Rku) ranging from 1.00 to 3.10, inclusive, forming a peeling layer on the first main surface, and then forming the metal layer on the peeling layer by physical vapor deposition;
a second step of producing a transparent base with a transparent adhesive layer by preparing the transparent base, and forming the transparent adhesive layer on at least one of both surfaces of the transparent base; and
a third step of bonding a surface of the metal layer with the support on which the metal layer is provided and a surface of the transparent base with the transparent adhesive layer on which the transparent adhesive layer is provided, and then peeling off the support and the peeling layer from the metal layer.

* * * * *